(12) United States Patent
Fischer et al.

(10) Patent No.: US 10,045,653 B2
(45) Date of Patent: Aug. 14, 2018

(54) BREWING APPARATUS AND METHOD FOR OPERATING A BREWING APPARATUS

(71) Applicant: EUGSTER/FRISMAG AG, Amriswil (CH)

(72) Inventors: Daniel Fischer, Romanshorn (CH); Remo Sonderegger, Tagerwilen (CH)

(73) Assignee: Eugster / Frismag AG, Amriswil (CH)

( * ) Notice: Subject to any disclaimer, the term of this patent is extended or adjusted under 35 U.S.C. 154(b) by 347 days.

(21) Appl. No.: 14/422,606

(22) PCT Filed: Aug. 15, 2013

(86) PCT No.: PCT/EP2013/067069
§ 371 (c)(1),
(2) Date: Feb. 19, 2015

(87) PCT Pub. No.: WO2014/029685
PCT Pub. Date: Feb. 27, 2014

(65) Prior Publication Data
US 2015/0238039 A1 Aug. 27, 2015

(30) Foreign Application Priority Data

Aug. 20, 2012 (DE) .......... 10 2012 107 615
Sep. 14, 2012 (DE) .......... 10 2012 108 653

(51) Int. Cl.
*A47J 31/44* (2006.01)
*A47J 31/40* (2006.01)
*A47J 31/36* (2006.01)

(52) U.S. Cl.
CPC ......... *A47J 31/407* (2013.01); *A47J 31/3633* (2013.01); *A47J 31/44* (2013.01); *A47J 31/4403* (2013.01)

(58) Field of Classification Search
CPC ...... A47J 31/407; A47J 31/3633; A47J 31/44; A47J 31/4403
See application file for complete search history.

(56) References Cited

U.S. PATENT DOCUMENTS

| 5,638,741 A | * | 6/1997 | Cisaria ............. A47J 31/0684 |
| | | | 99/295 |
| 5,755,149 A | * | 5/1998 | Blanc ............... A47J 31/3623 |
| | | | 99/289 T |

(Continued)

FOREIGN PATENT DOCUMENTS

| CN | 1203774 A | 1/1999 |
| CN | 101453929 A | 6/2009 |

(Continued)

*Primary Examiner* — Sean Michalski
(74) *Attorney, Agent, or Firm* — The Dobrusin Law Firm P.C.

(57) ABSTRACT

The present invention relates to a brewing apparatus for extracting a portion capsule, comprising a first brewing chamber element and a second brewing chamber element, the first and/or the second brewing chamber element being movable along an axial direction from a loading position, in which the first and the second brewing chamber element are spaced apart from one another, to an extraction position, in which the first and the second brewing chamber element form a substantially closed brewing chamber, and the brewing apparatus further comprising a drive mechanism for moving the first and/or second brewing chamber element, characterized in that the brewing apparatus has a separate locking mechanism for locking the brewing chamber in the extraction position.

17 Claims, 17 Drawing Sheets

(56) References Cited

U.S. PATENT DOCUMENTS

| | | | |
|---|---|---|---|
| 5,776,527 A * | 7/1998 | Blanc | A47J 31/3633 206/5 |
| 6,035,762 A * | 3/2000 | Ruckstuhl | A47J 31/3623 99/289 R |
| 6,503,221 B1 * | 1/2003 | Briggs | F04B 43/08 604/151 |
| 7,444,927 B1 * | 11/2008 | Crosville | A47J 31/3676 99/295 |
| 7,637,704 B2 * | 12/2009 | Morin | B60P 7/132 410/69 |
| 7,747,190 B2 * | 6/2010 | Kimura | G03G 21/1853 312/215 |
| 7,946,217 B2 * | 5/2011 | Favre | A47J 31/0668 426/433 |
| 8,210,098 B2 * | 7/2012 | Boussemart | A47J 31/3633 99/289 R |
| 8,973,451 B2 * | 3/2015 | Oswald | E21B 41/0007 251/69 |
| 9,351,602 B2 * | 5/2016 | Icardi | A47J 31/3633 |
| 2001/0011502 A1 * | 8/2001 | Bonanno | A47J 31/36 99/302 R |
| 2002/0023543 A1 * | 2/2002 | Schmed | A47J 31/3623 99/295 |
| 2002/0088348 A1 * | 7/2002 | Cortese | A47J 31/3638 99/295 |
| 2005/0129809 A1 * | 6/2005 | Cortese | A47J 31/3633 426/77 |
| 2008/0006159 A1 * | 1/2008 | Fischer | A47J 31/3685 99/289 R |
| 2009/0199720 A1 | 8/2009 | Levi et al. | |
| 2009/0249961 A1 * | 10/2009 | Cheng | A47J 31/3638 99/289 R |
| 2009/0308258 A1 | 12/2009 | Boussemart et al. | |
| 2010/0037779 A1 * | 2/2010 | Pecci | A47J 31/3633 99/289 R |
| 2010/0101428 A1 * | 4/2010 | Fin | A47J 31/3638 99/295 |
| 2010/0206177 A1 * | 8/2010 | Ricotti | A47J 31/0673 99/295 |
| 2011/0000377 A1 * | 1/2011 | Favre | A47J 31/3628 99/289 R |
| 2011/0097463 A1 * | 4/2011 | Deuber | A47J 31/3623 426/394 |
| 2011/0308396 A1 * | 12/2011 | Mori | A47J 31/46 99/275 |
| 2012/0207893 A1 * | 8/2012 | Kruger | A47J 31/3633 426/431 |
| 2013/0001251 A1 * | 1/2013 | Mori | A47J 31/3633 99/295 |
| 2013/0068110 A1 * | 3/2013 | Pagano | A47J 31/3638 99/295 |
| 2013/0084376 A1 | 4/2013 | Fischer et al. | |
| 2013/0092031 A1 * | 4/2013 | Magno | A47J 31/3633 99/297 |
| 2013/0305932 A1 * | 11/2013 | Epars | A47J 31/0668 99/295 |
| 2015/0238039 A1 | 8/2015 | Fischer et al. | |
| 2016/0242591 A1 * | 8/2016 | Rubin | A47J 31/3633 |

FOREIGN PATENT DOCUMENTS

| | | |
|---|---|---|
| CN | 101484050 A | 7/2009 |
| CN | 101500457 A | 8/2009 |
| CN | 101610703 A | 12/2009 |
| CN | 102160756 A | 8/2011 |
| DE | 10334526 A1 | 2/2005 |
| DE | 202006002678 A1 | 4/2006 |
| DE | 102010044945 A1 | 12/2011 |
| EP | 1 721 553 A1 | 11/2006 |
| EP | 1767129 A1 | 3/2007 |
| EP | 1859714 A1 | 11/2007 |
| EP | 2 044 867 A1 | 4/2009 |
| EP | 2 070 452 A1 | 6/2009 |
| EP | 2884874 A1 | 6/2015 |
| WO | 2007016977 A1 | 2/2007 |
| WO | 2008/004116 A1 | 1/2008 |
| WO | 2008/152484 A2 | 12/2008 |
| WO | 2010/032271 A1 | 3/2010 |
| WO | 2014/029685 A1 | 2/2014 |

* cited by examiner

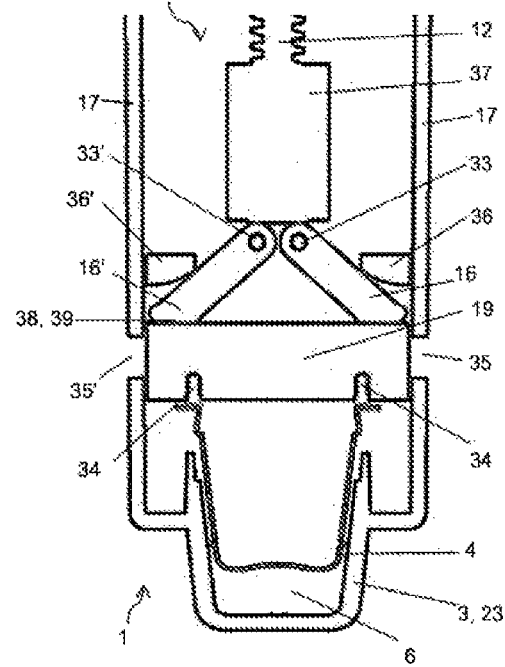
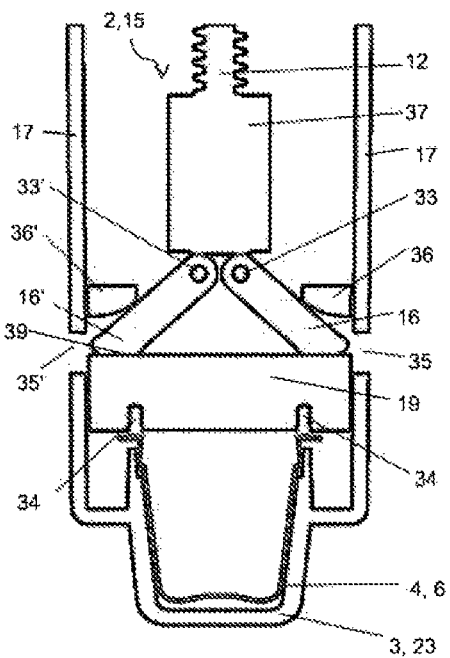
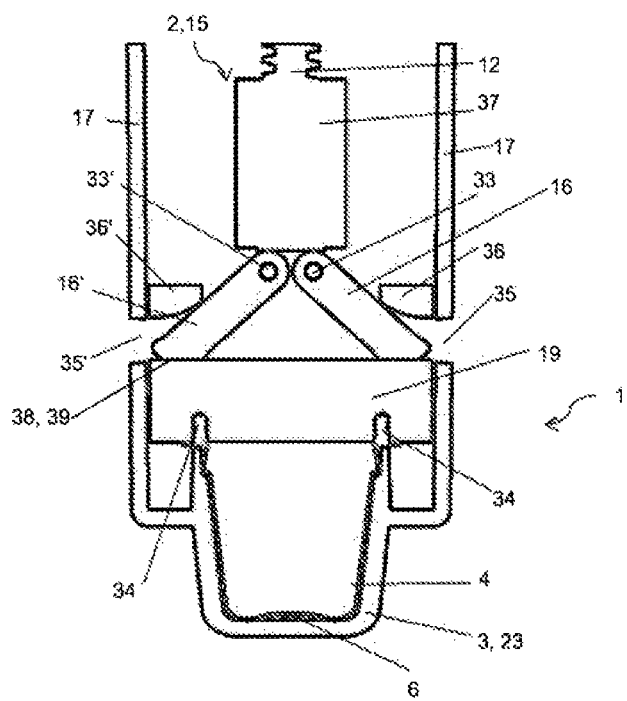

BREWING APPARATUS AND METHOD FOR OPERATING A BREWING APPARATUS

PRIOR ART

The present invention relates to a brewing apparatus for extracting a portion capsule, having a first brewing chamber element and a second brewing chamber element, wherein the first and/or the second brewing chamber element are/is movable along an axial direction from a loading position, in which the first and the second brewing chamber element are spaced apart from one another, into an extracting position, in which the first and the second brewing chamber element form a substantially closed brewing chamber, wherein the brewing apparatus displays a drive mechanism for moving the first and/or second brewing chamber element.

Such a brewing apparatus is disclosed in the document DE 10 2010 044 945 A1, for example. The brewing apparatus is designed for extracting a portion capsule for producing a beverage, in particular coffee. The brewing apparatus comprises a second brewing chamber element which is configured as a bell-shaped cavity for receiving a portion capsule which is filled with a beverage substance. A first brewing chamber element which is configured as a closure element is connected to a toggle lever and is movable along an axial direction, from a loading position into an extracting position. In the extracting position, the closure element closes the bell-shaped cavity and forms a substantially closed brewing chamber. On the closure element an injecting assembly for introducing an extraction fluid into the portion capsule is disposed, which extraction fluid interacts with the beverage substance within the portion capsule and is subsequently conveyed away out of the portion capsule by an extracting assembly which is disposed on the second brewing chamber element and is infed to a beverage container in order to provide a beverage. In the loading position, wherein the closure element and the bell-shaped cavity are spaced apart, the brewing apparatus is loaded with the portion capsule. The closure element is subsequently displaced into the extracting position by means of the toggle lever. Here, perforating means which are disposed on the closure element and on the bell-shaped cavity perforate the portion capsule, such that openings for infeeding and conveying out the extraction fluid during the brewing operation are created in the extracting position, wherein a high extraction pressure prevails within the brewing chamber. In order for a substantially closed brewing chamber to be formed, it is known for brewing apparatuses of this type to be equipped by means of a toggle lever joint which displaces the closure element from a loading position into an extracting position.

It is disadvantageous in such brewing apparatuses that the high extraction pressure prevailing in the brewing chamber during the brewing operation has to be absorbed solely by the toggle lever joint, such that it is not possible for a brewing chamber which is secure against leakage of the extraction fluid and which is adequately tight to be guaranteed. The use of a toggle lever joint which meets requirements of this type is very complex and expensive. It is thus desirable for a brewing apparatus which holds a brewing chamber which is under high extraction pressure during the brewing operation in a closed state in such a manner and thus secures said brewing chamber against leakage of the extraction fluid to be provided, such that the entire force on account of the high extraction pressure in the brewing chamber does not have to be compensated for solely by a toggle lever joint. Moreover, it is desirable for a brewing apparatus which displays a high level of sealing of the brewing chamber while at the same time offering low production and material costs to be provided.

DISCLOSURE OF THE INVENTION

The invention is thus based on the object of providing a brewing apparatus and a method for operating a brewing apparatus which does not display the disadvantages of the prior art and in which the extraction pressure does not or only in part has to be absorbed by a toggle lever joint, on account of which the sealing of the brewing chamber during the brewing operation is improved. Moreover, more cost-effective production of a brewing apparatus of this type is to be enabled.

The object is achieved with a brewing apparatus for extracting a portion capsule, having a first brewing chamber element and a second brewing chamber element, wherein the first and/or the second brewing chamber element are/is movable along an axial direction from a loading position, in which the first and the second brewing chamber element are spaced apart from one another, into an extracting position, in which the first and the second brewing chamber element form a substantially closed brewing chamber, wherein the brewing apparatus displays a drive mechanism for moving the first and/or second brewing chamber element, wherein the brewing apparatus displays a separate locking mechanism for locking the brewing chamber in the extracting position. In comparison with the prior art, the brewing apparatus according to the invention has the advantage that, in contrast to the prior art, the brewing chamber can be held in the closed state using a separate locking apparatus, in order to enable increased tightness of the brewing chamber which during the brewing operation is under high extraction pressure. Moreover, in the case of the locking mechanism according to the invention, the locking force is substantially reduced. On account thereof, the parts of the locking mechanism can be implemented so as to be simpler and more cost-effective. The production of beverages often places high requirements on the brewing apparatus in order for a beverage of high quality to be produced. For example, in the production of espresso hot water is pressed through the beverage substance at high pressure. The extraction of such a liquid at high pressure places particularly high requirements on the tightness of the brewing chamber of the brewing apparatus, in order for a beverage of the desired quality to be obtained. However, once the high pressure which prevails in a closable brewing chamber has to be accommodated solely by a toggle lever joint, high complexity and high costs are thus connected with the production of such a brewing apparatus, the desired result, nevertheless, not being able to be guaranteed at all times. The brewing apparatus according to the invention, therefore, displays a separate locking apparatus which is provided solely for locking the brewing apparatus in the extracting position. In a particularly advantageous way, the brewing apparatus according to the invention by means of the locking mechanism absorbs the high forces which arise during the brewing operation on account of a high extraction pressure within the brewing chamber. The present invention, therefore, in a particularly suitable way meets the increasing demand for high-quality brewing apparatuses at reasonable prices. In that the separate locking mechanism absorbs at least part of the high pressure prevailing in the brewing chamber during the brewing operation, the drive apparatus is thus particularly relieved. Thereby, a particularly stable and at the same time cost-effective brewing apparatus is provided on account of reduced production and material costs.

Advantageous design embodiments and refinements of the invention may be derived from the dependent claims and from the description with reference to the drawings.

According to a preferred embodiment of the present invention it is provided that the drive mechanism displays a drive element which preferably is configured so as to be a toggle lever joint, a gear rack, a spindle and/or a pivot gear. In the closure movement for transferring the brewing apparatus from a loading position into an extracting position, a drive mechanism configured in such a manner in an advantageous way leads to a connection, in particular without slippage, existing between drive mechanism and the displaceable brewing chamber element, such that a particularly stable brewing apparatus having a long service life is made available. Furthermore, it is advantageously possible for the brewing apparatus to be actuated using a low effort in force, in particular by way of a suitably chosen gearing ratio, such that the brewing chamber can be moved within a short path and with a low effort in force into the extracting position.

According to a preferred embodiment of the present invention it is provided that the drive mechanism preferably is manually actuatable by means of a hand lever and/or is automatically drivable by means of a drive motor. In an advantageous way an automatic drive mechanism leads to particular user friendliness, since the brewing chamber can be closed by actuating a switch or button. In the case of a drive mechanism which is automatically configured in such a manner, the output of the drive motor can moreover be reduced and costs saved on account thereof.

According to a preferred embodiment of the present invention it is provided that, for locking the brewing chamber in the extracting position, the locking mechanism is transferable from a releasing position into a locking position. In an advantageous way the brewing apparatus in the loading position, in which the first and the second brewing chamber element are spaced apart from one another, is fillable with a portion capsule in a particularly comfortable manner, in particular since on account of the spacing from perforation means which are disposed on the first and/or second brewing chamber element, the risk of injury is substantially reduced.

According to a preferred embodiment of the present invention it is provided that the locking mechanism displays a latch, wherein the latch preferably is configured so as to be roller-shaped or ball-shaped. In the event of the locking mechanism being transferred from the releasing position into the extracting position, the roller-shaped or ball-shaped configuration of the latch in an advantageous way leads to the locking movement taking place with a negligible effort in force, in particular due to the rolling movement of the latch. On account thereof, a particularly user-friendly brewing apparatus is provided.

According to a preferred embodiment of the present invention it is provided, that the first brewing chamber element displays a retaining element, at least one return spring, and a displacing element, wherein the retaining element and the displacing element are connected by means of a return spring and wherein the retaining element is displaceable in relation to the displacing element. In an advantageous way the retaining element which is connected to the displacing element by means of a return spring during the brewing operation in the extracting position leads to the latch being jammed between the first and second chamfer and the retaining element in such a manner that the brewing chamber which is under high extraction pressure transmits a force via the retaining element to the latch, and the latter in turn at least in part to the wall part of the brewing apparatus, in particular in order to unburden the drive apparatus. A particularly tight and firm closure of the brewing chamber is thus enabled, such that a beverage can be produced, in particular at high pressure, by means of a hot extraction fluid.

According to a preferred embodiment of the present invention it is provided that the at least one latch in the releasing position is displaceable along the axial direction between the first brewing chamber element and the wall part. In the event of the locking mechanism being transferred from the releasing position into the extracting position, a displaceably disposed latch in an advantageous way leads to the locking movement taking place with a negligible effort in force, due to the rolling movement of the latch. On account thereof, a particularly user-friendly brewing apparatus is provided.

According to a preferred embodiment of the present invention it is provided that a first wall of a wall part which is fixedly connected to the brewing apparatus displays at least one first chamfer, and a second wall of the displacing element displays at least one second chamfer, wherein the first chamfer, the second chamfer, and the retaining element contact the latch in the locking position. In an advantageous way contacting of the latch with the first chamfer, the second chamfer, and the retaining element during the brewing operation in the locking position leads to the latch being jammed between the first and second chamfer and the retaining element in particular in such a manner that the brewing chamber which is under high extracting pressure transmits a force via the retaining element to the latch, and the latter in turn at least in part to the wall part of the brewing apparatus, in order to unburden the drive apparatus. A particularly tight and firm closure of the brewing chamber is thus enabled, such that a beverage can be produced, in particular at high pressure, by means of a hot extraction fluid.

According to a preferred embodiment of the present invention it is provided that the second chamfer is configured in such a manner that, in the event of the locking mechanism being transferred from the releasing position into the locking position, a movement of the latch in a transverse direction, which is perpendicular to the axial direction, into a cavity which is formed by the first chamfer and the second chamfer is caused. In an advantageous way the movement of the latch into the cavity in the event of the locking movement leads to the locking mechanism being operable without an additional locking step, for example the insertion of a locking bolt, to be carried out by the user. On account thereof, the advantage in comparison with the prior art is achieved in that in the case of the brewing apparatus according to the invention the additional locking step cannot be forgotten by the user, such that on account thereof the brewing apparatus according to the invention is particularly tight.

According to a preferred embodiment of the present invention it is provided that the arrester is configured such that during the extracting process a returning force which acts counter to the axial direction from the retaining element on the latch, which is located in the locking position, is absorbed by the first chamfer. In an advantageous way the returning force acting in the axial direction, which is absorbed by the first chamfer, during the extracting process leads to in particular the drive apparatus being relieved in a particularly efficient manner and thus a particularly tight and firm closure of the brewing chamber being enabled. In this way, a beverage, for example an espresso, can be produced by means of a hot extraction fluid, in particular at high pressure, using a particularly cost-effective brewing apparatus according to the invention.

According to a preferred embodiment of the present invention it is provided that the locking mechanism displays a piston and a latch which is rotatably connected to the piston and which is provided for engagement in an opening of a wall part and/or for locking, using at least one blocking element. In an advantageous way, the engagement of the latch in the opening, in particular a gap or a clearance, of the wall part leads to the locking mechanism being operable without an additional locking step, for example the insertion of a locking bolt, to be carried out by the user. On account thereof, the advantage in comparison with the prior art is achieved, in that in the case of the brewing apparatus according to the invention the additional locking step cannot be forgotten by the user, such that on account thereof the brewing apparatus according to the invention is particularly tight. It is furthermore advantageously possible that the forces, which are caused by the high extraction pressure which prevails in the brewing chamber during the brewing operation, which is required, for example, for brewing expresso beverages, are, in particular completely, absorbed by the wall part, such that the drive mechanism is relieved. On account thereof, the advantage of a significantly more cost-effective brewing apparatus being provided is achieved.

According to a preferred embodiment of the present invention it is provided that the latch, in the loading position, is disposed so as to be angled in relation to the axial direction, wherein the latch, in the locking position, is aligned so as to be substantially perpendicular to the axial direction. In an advantageous way the pivotability of the latch between an angled arrangement and an arrangement which is aligned so as to be substantially perpendicular to the axial direction leads to a brewing apparatus which is particularly stable over its service life and robust being provided. Indeed, frequent, in particular daily usage, of the brewing apparatus according to the invention places high demands on mechanical stability, in particular on the stability of the drive and locking mechanisms.

According to a preferred embodiment of the present invention it is provided that the latch displays a sliding face for sliding on a guiding face of a displacing element of the first brewing chamber element. In an advantageous way the sliding face for sliding on a guiding face leads to a brewing apparatus which is particularly stable over its service life and robust being provided. Indeed, frequent, in particular daily usage, of the brewing apparatus according to the invention places high demands on mechanical stability, in particular on the locking mechanism. On account of the latch displaying a sliding face and the displacing element displaying a guiding face, it is furthermore advantageously possible to make available a brewing apparatus which, in comparison with the prior art, is more cost-effective and particularly simple to produce.

According to a further subject matter or a preferred embodiment it is provided that the brewing apparatus, for extracting a portion capsule, displays a first brewing chamber element and a second brewing chamber element, wherein the first and/or the second brewing chamber element is movable along an axial direction from a loading position, in which the first and the second brewing chamber element are spaced apart from one another, into an extracting position, in which the first and the second brewing chamber element form a substantially closed brewing chamber, wherein the brewing apparatus displays a drive mechanism for moving the first and/or second brewing chamber element, wherein the drive mechanism displays a hand lever and a toggle lever joint, wherein the hand lever displays a first coupling part and the toggle lever joint displays a second coupling part, wherein, in order to transmit a movement of the hand lever to a movement of the toggle lever joint, the first and the second coupling part are in operative interconnection by way of a gear wheel connection. In an advantageous way a drive mechanism which is configured in this manner in the event of the closure movement for transferring the brewing apparatus from a loading position into an extracting position leads to a connection, in particular without slippage, existing between the drive mechanism and the displaceable brewing chamber element, such that a particularly stable brewing apparatus having a long service life is made available. It is furthermore advantageously possible for the brewing apparatus to be actuated by means of a low effort in force by way of a suitably chosen gearing ratio, such that the brewing chamber can be moved within a short path with a low effort in force into the extracting position.

According to a preferred embodiment of the present invention it is provided that the toggle lever joint displays a first and a second toggle lever, wherein the first toggle lever displays the second coupling part, and the second toggle lever, on a first side, is rotatably connected to the first toggle lever, and, on a second side, is displaceably disposed along the axial direction. In an advantageous way a drive mechanism which is configured in such a manner in the event of the closure movement for transferring the brewing apparatus from a loading position into an extracting position leads to a particularly favorable, user-friendly transmission of force from a hand-lever movement to the closure movement running in the axial direction for transferring the locking mechanism from a releasing position into a locking position being enabled.

According to a preferred embodiment of the present invention it is provided that the latch on a connecting point is pivotably connected to the retaining element, wherein the latch, in particular in the locking position of the locking mechanism, is jammable between a blocking element which is fixedly connected to the brewing apparatus and a displacing element which is disposed so as to be displaceable in relation to the retaining element.

According to a preferred embodiment of the present invention it is provided that the latch, by means of transferring the locking mechanism from the releasing position into the locking position, is pivotable in a transverse direction which is perpendicular to the axial direction about a pivot axle which runs through the connecting point into an opening of a wall part of the brewing apparatus.

According to a preferred embodiment of the present invention it is provided that the latch, by means of a relative movement of the displacing element in relation to the retaining element, is pivotable into the opening and/or out of the opening.

According to a preferred embodiment of the present invention it is provided that the displacing element is provided for impinging the latch with a torque about a pivot axle which runs through the connecting point in a perpendicular manner to the axial direction.

According to a preferred embodiment of the present invention it is provided that the blocking element is provided for impinging the latch with a further torque about the pivot axis, wherein the further torque is, in particular, counter to the torque.

According to a further subject matter or a preferred embodiment of the present invention a method for operating a brewing apparatus, in particular the brewing apparatus according to the invention, is provided, wherein, in a first method step, a first and/or a second brewing chamber element are/is moved along an axial direction from a loading position, in which the first and the second brewing chamber element are spaced apart from one another, into an extracting position, in which the first and the second brewing chamber element form a substantially closed brewing chamber, and in a second method step, in order for the brewing chamber to be locked by means of a locking mechanism, which is transferable from a releasing position into a locking position in order for the brewing chamber to be locked in the extracting position, a latch of the locking mechanism is displaced in a transverse direction which is perpendicular to the axial direction. In an advantageous way, the movement of the latch into the cavity in the event of the locking movement leads to the locking mechanism being operable without an additional locking step, for example the manual insertion of a locking bolt, which has to be carried out by the user. On account thereof, the advantage in comparison with the prior art is achieved in that in the case of the brewing apparatus according to the invention the additional locking step cannot be forgotten by the user, such that, on account thereof, the brewing apparatus according to the invention is particularly tight. Moreover, the high extraction pressure within the brewing chamber when the beverage is extracted does not have to be absorbed solely by the drive mechanism. On account thereof, a drive mechanism which is more cost-effective and simpler to produce is advantageously made available. Furthermore, pivoting of the latch about a pivot axis which is perpendicular to the axial direction effects that the forces, arising from the high extraction pressure prevailing in the brewing chamber during brewing operations, which are necessary, for example, for brewing expresso beverages, being, in particular completely, absorbed by the wall part, such that the drive mechanism is relieved. On account thereof, the further advantage is achieved in that a significantly more cost-effective brewing apparatus is made available.

According to a preferred embodiment of the present invention it is provided that, in a third method step, in order for the brewing chamber to be unlocked by means of a locking mechanism, the latch of the locking mechanism is displaced in the transverse direction, and, in a fourth step, the first and/or second brewing chamber element is moved back along the axial direction, from the extracting position into the loading position. In an advantageous way the movement of the latch out of the cavity in the event of the locking movement leads to the locking mechanism being operable without an additional locking step, for example the removal of a locking bolt, which has to be carried out by the user. On account thereof, the advantage in comparison with the prior art is achieved in that in the case of the brewing apparatus according to the invention the additional locking step cannot be forgotten by the user, such that the brewing apparatus cannot be inadvertently destroyed by an excessive effort in force and the hand lever be broken off, for example.

According to a preferred embodiment of the present invention it is provided that, during the first method step, the latch is displaced in the axial direction from a second chamfer of a displacing element of the first brewing chamber element, and, during the second method step, the latch is displaced in the transverse direction from the second chamfer into a cavity which is formed by the first chamfer of the wall of the brewing apparatus and by the second chamfer, and during the extracting process a returning force which acts counter to the axial direction from a retaining element of the first brewing chamber element on the latch, which is located in the locking position, is jammed in the cavity between the first chamfer, the second chamfer, and the retaining element. In an advantageous way jamming the latch in the cavity between the first chamfer, the second chamfer, and the retaining element during the brewing operation in the locking position leads to the brewing chamber which is under a high extraction pressure transmitting a force via the retaining element to the latch, and the latter in turn transmitting at least in part to the wall part of the brewing apparatus, in order to relieve the drive apparatus. On account thereof, a particularly tight and firm closure of the brewing chamber is enabled, such that a beverage can be produced by means of a hot extraction fluid at high pressure.

According to a preferred embodiment of the present invention it is provided that, during the third method step, the latch is moved by the first chamfer in the transverse direction out of a cavity which is formed by the first chamfer and the second chamfer, and, in the fourth method step, the latch is displaced counter to the axial direction by the retaining element. In an advantageous way the movement of the latch out of the cavity in the event of the locking movement leads to the locking mechanism being operable without an additional locking step, for example the removal of a locking bolt, which has to be carried out by the user. On account thereof, the advantage in comparison with the prior art is achieved in that in the case of the brewing apparatus according to the invention the additional locking step cannot be forgotten by the user, such that the brewing apparatus cannot be inadvertently destroyed by an excessive effort in force and the hand lever be broken off, for example.

According to a preferred embodiment of the present invention it is provided that, during the first method step, a sliding face of the latch is displaced on a guiding face of the displacing element. In an advantageous way displacing the sliding face of the latch on a guiding face of the displacing element leads to a brewing apparatus which is particularly stable over its service life and robust being provided. Indeed, frequent, in particular daily usage, of the brewing apparatus according to the invention places high demands on mechanical stability, in particular on the locking mechanism. On account of the latch displaying a sliding face and of the displacing element displaying a guiding face, it is furthermore advantageously possible for a brewing apparatus which in comparison with the prior art is more cost-effective and particularly simple to produce to be made available.

According to a preferred embodiment of the present invention it is provided that, during the second method step, the latch is pivoted in such a manner that one end of the latch engages in an opening of the wall part and/or is blocked in relation to a movement in the axial direction by at least one blocking element. In an advantageous way the engagement of the latch in the opening, in particular a gap or a clearance, of the wall part leads to the locking mechanism being operable without an additional locking step, for example the insertion of a locking bolt, which as to be carried out by the user. On account thereof, the advantage in comparison with the prior art is achieved in that in the case of the brewing apparatus according to the invention the additional locking step cannot be forgotten by the user, such that on account thereof the brewing apparatus according to the invention is particularly tight. It is furthermore advantageously possible that the forces, which are caused by the high extraction pressure which prevails in the brewing chamber during the brewing operation, which is required, for example, for brewing expresso beverages, are, in particular completely, absorbed by the wall part, such that the drive mechanism is relieved. On account thereof, the further advantage that a significantly more cost-effective brewing apparatus is made available is achieved.

Further details, features and advantages of the invention are derived from the drawings and from the following description of preferred embodiments by means of the drawings. The drawings here merely illustrate exemplary embodiments of the invention, which do not limit the substantial concept of the invention.

BRIEF DESCRIPTION OF THE FIGURES

FIGS. 4a to 4e show schematic views of a locking mechanism according to a fourth embodiment of the present invention.

EMBODIMENTS OF THE INVENTION

In the various figures, same parts are always provided with the same reference signs and are thus typically also in each case only named or mentioned once, respectively.

Figure 1A:
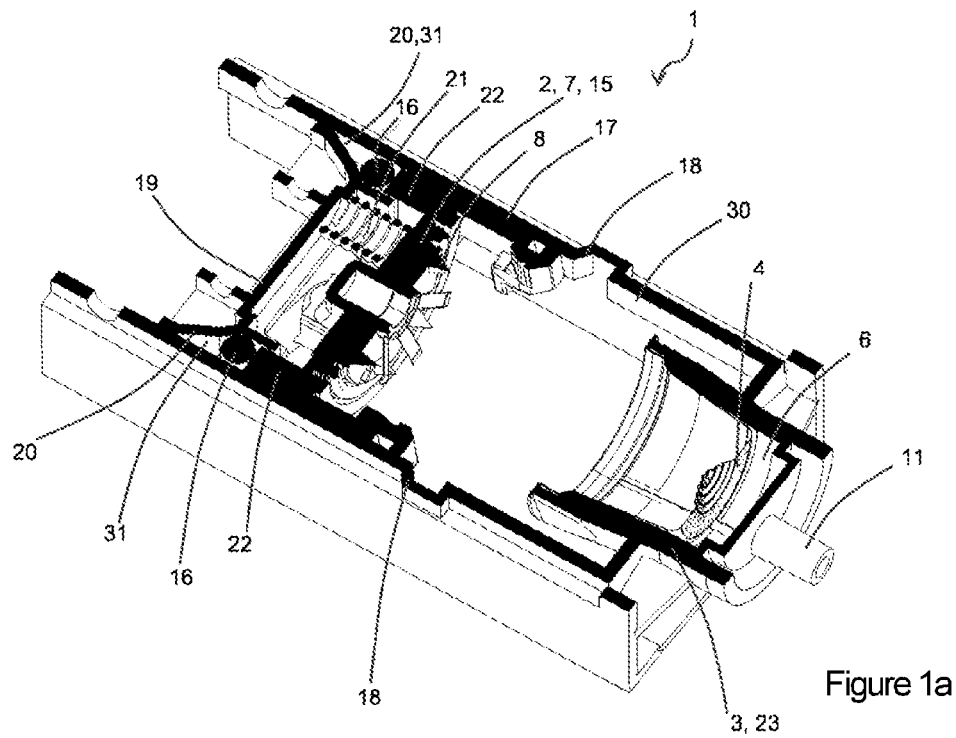
FIGS. 1a to 1b show schematic sectional views of a brewing apparatus according to a first embodiment of the present invention.
Figure 1B:
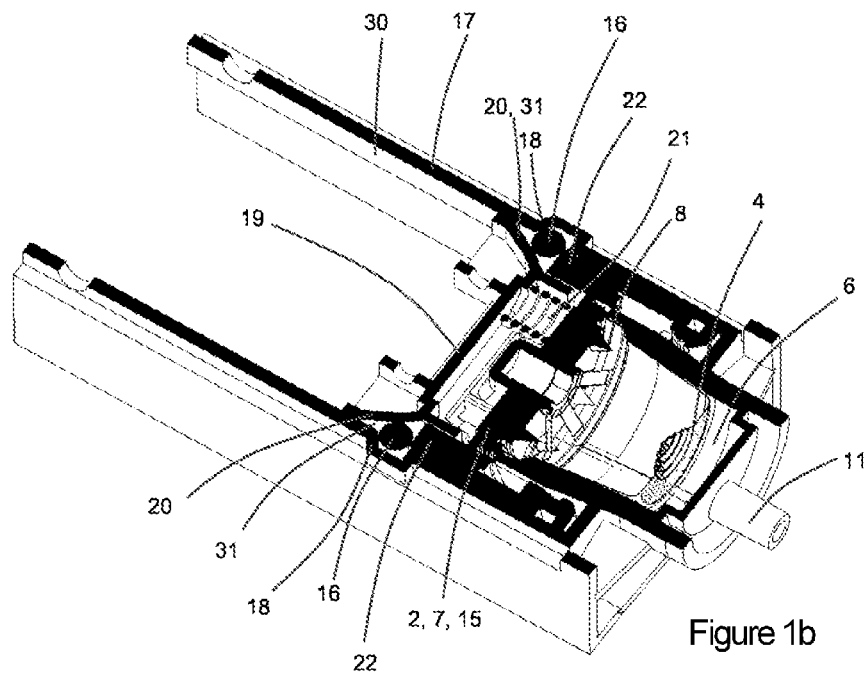

In FIGS. 1a to 1b schematic sectional views of a brewing apparatus 1 according to a first embodiment of the present invention are illustrated. The brewing apparatus 1 displays a first brewing chamber element 2 and a second brewing chamber element 3 which are spaced apart from each other in a loading position, such that a portion capsule 4 which is filled with a beverage substance (not illustrated) can be introduced in the loading direction. The first brewing chamber element 2 is movable in the axial direction 5, in order to form a substantially closed brewing chamber 6 with the second brewing chamber element 3 which is provided for receiving the portion capsule 4 (see FIG. 2). The first brewing chamber element 2 comprises a perforating element 7 having perforating tips 8 for perforating the capsule lid 9, and a water infeed duct (not illustrated) for injecting an extraction fluid into the portion capsule 4 during the brewing operation. The second brewing chamber element 3 comprises a further perforating tip (not illustrated) for perforating the capsule base 10 and for conveying away the extraction fluid which has interacted with the beverage substance in the interior of the portion capsule 4, and a discharge duct 11 for conveying away the extraction fluid into a drinking vessel (not illustrated).

The brewing apparatus 1 further displays a drive mechanism 12 which is preferably configured as a toggle lever joint 13 (see FIG. 3), for transferring the first brewing chamber element 2 and the second brewing chamber element 3 from the loading position into an extracting position. Optionally, the toggle lever joint 13 of the drive mechanism 12 is driven by a drive motor, such that a reduction of the output of the drive motor in comparison with a brewing apparatus without a toggle lever joint is achieved. On account thereof, a cost-saving production of the brewing apparatus 1 according to the invention is possible. The toggle lever joint 13 preferably is manually actuated by way of the hand lever 14.

Furthermore, a separate locking mechanism 15 is disposed between the drive mechanism 12 and the second brewing chamber element 3, on account of which the required locking force for the hermetic closure of the brewing chamber 6 is further reduced and an even simpler and more cost-effective implementation of the brewing apparatus 1 is enabled. The locking mechanism 14 comprises a latch 16 which preferably is configured as a ball or a roller, a first chamfer 18 which is disposed on a wall part 17 of the brewing apparatus 1, a second chamfer 20 which is disposed on a displacing element 19 of the first brewing chamber element 2, and a retaining element 22 which by way of a return spring (see FIG. 2) is connected to the displacing element 19 of the first brewing chamber element 2. Here, the return spring 21 very preferably is disposed on an axis which extends along the axial direction 5 and/or is disposed so as to be parallel with this axis.

In FIG. 1a a schematic sectional view of a brewing apparatus 1 according to the first embodiment of the present invention is illustrated in the loading position. The first brewing chamber element 2 and the second brewing chamber element 3 are spaced apart from one another in such a manner that a portion capsule 4 can be introduced in a loading direction which runs perpendicularly to the axial direction 5 (perpendicularly in relation to the paper plane in FIG. 2). The spacing between the first 2 and the second brewing chamber element 3 preferably is sufficiently large for a risk of injury to the user by the perforating tips 8 which are disposed on the perforating element 7 of the first brewing chamber element 2 during insertion of the portion capsule 4 to be minimized.

The toggle lever joint 13 of the drive mechanism 12 in the loading position is in a buckling position, such that, utilizing the lever principle, by means of a hand lever 14 or a drive motor (not illustrated) which is connected to the toggle lever joint 13, a closure movement in the axial direction 5 is rapidly and forcefully carried out.

The locking mechanism 15, in the loading position, is disposed in a releasing position, wherein the latch 16 is conjointly moved with the first brewing chamber element 2 along the axial direction 5 within a cavity which is formed by the wall part 17, the retaining element 22, and the second chamfer 20. In the event of a movement of the first brewing chamber element 2 in the axial direction 5, from the loading position into the extracting position, the latch 16 is pushed into motion by the second chamfer 20, whereas in the event of a movement in the counter direction 5 the retaining element 22 pushes the latch 16 into motion. Here, on account of the preferably ball-shaped or roller-shaped shape of the latch 16, in particular merely negligible friction losses arise when displacing the latch 16 with the first brewing chamber element 2, which furthermore has an advantageous effect on the cost-saving implementation of the drive mechanism 12.

In FIG. 1b a schematic sectional view of a brewing apparatus 1 according to the first embodiment of the present invention is illustrated in the extracting position. The first brewing chamber element 2 and the second brewing chamber element 3 together form a substantially closed brewing chamber 6 in which, during the brewing operation, a portion capsule 4 is positioned which is filled with a beverage substance and into which, preferably at high pressure, a hot extraction fluid, which interacts with the beverage substance and is conveyed away through the discharge duct 11 into a drinking vessel, is conveyed in. The brewing chamber 6 preferably is hermetically locked in such a manner that leakage of the extraction fluid from the brewing chamber 6 during the brewing operation is not possible on account of deficient sealing.

The toggle lever joint 13 of the drive mechanism 12 in the extracting position is in an extended position and absorbs part of that force from the first brewing chamber element 2 that, on account of the high pressure in the brewing chamber 6 is created during the brewing operation, and is transmitted to the first brewing chamber element 2.

The locking mechanism 15, in the extracting position, is disposed in a locking position, wherein the latch 16 is jammed within a cavity which is formed by the first chamfer 18 of the wall part 17, the retaining element 22, and the second chamfer 20. On account thereof, transmission of that force to the wall part 17 of the brewing chamber 6 takes place which, on account of the high pressure in the brewing chamber 6 is created during the brewing operation, and is transmitted via the retaining element 22 of the first brewing chamber element 2 to the latch 16. This transmission of force advantageously leads to the toggle lever joint 13 being relieved, on account of which a lower closing force, in particular during the brewing operation, is required, on account of which a simpler and more cost-effective implementation of the brewing apparatus 1 as compared with the prior art is enabled.

In FIGS. 2a to 2g schematic views of a locking mechanism 15 according to a second embodiment of the present invention are illustrated, wherein the individual steps for locking and unlocking the locking mechanism 15 will be explained in more detail.

Figure 2A:
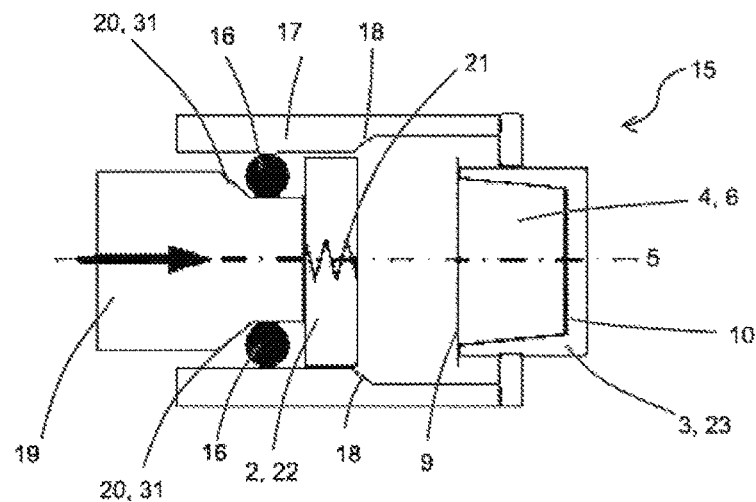
FIGS. 2a to 2g show schematic views of a locking mechanism according to a second embodiment of the present invention.

FIG. 2a depicts a brewing apparatus 1 which is situated in the loading position, having a locking mechanism 15 in the releasing position. The latch 16 here is displaceably disposed along the axial direction 5, between a first wall part 17, displaying a first chamfer 18, and a first brewing chamber element 2, displaying a displacing element 19 having a second chamfer 2, a retaining element 22, and a return spring 21, which elastically connects the retaining element 22 to the displacing element 19. A portion capsule 4 here is positioned in a receiving element 23, which is provided for receiving the portion capsule 4 and is designed in a bell-shaped manner, of a second brewing chamber element 3 which is fixedly connected to the wall part 17. On account of the negligible rolling friction of the latch 16, the design of the latch 16, which is in particular ball-shaped or roller-shaped, enables here a particularly easy and simple displacement of the first brewing chamber element 2.

Figure 2B:
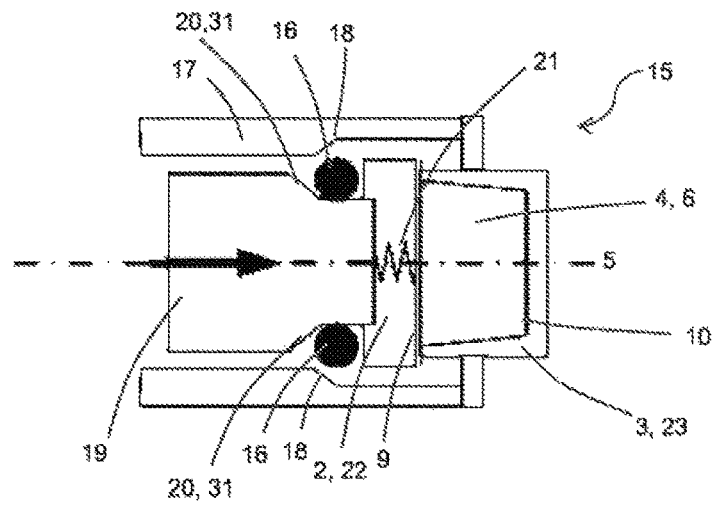

In FIG. 2b the first brewing chamber element 2 and the second brewing chamber element 3 are illustrated in the extracting position, wherein a substantially closed brewing chamber 6 is formed. The locking mechanism 15, in contrast, is located in the releasing position. The latch 16 here is displaceably disposed in particular in a transverse direction which runs perpendicularly to the axial direction 5 in a cavity which is formed by the first chamfer 18, the second chamfer 20, and the retaining element 22.

Figure 2C:
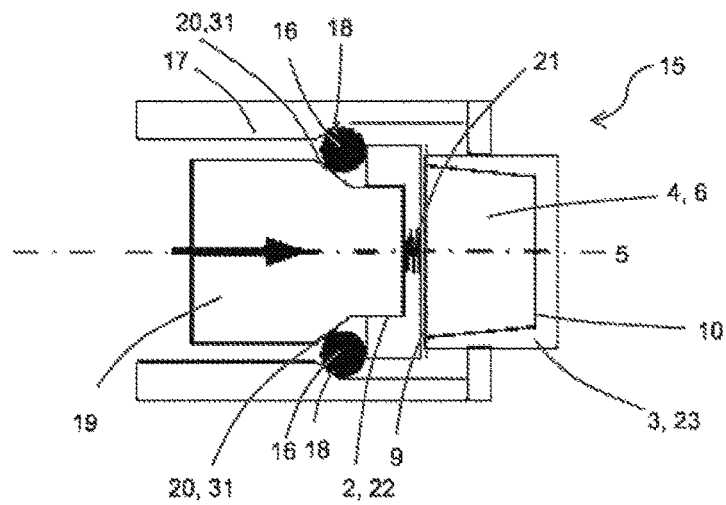

In FIG. 2c it is illustrated that the first and the second brewing chamber element 3 are located in the extracting position, and the locking mechanism 15 is in the locking position. During the transition from the releasing position into the locking position the return spring 21 is compressed, on account of which a movement of the displacing element in relation to the retaining element 22 is caused, such that a movement on the second chamfer 20, which is disposed on the displacing element 19, causes a displacement of the latch 16 in the transverse direction which runs perpendicularly to the axial direction 5. The latch 16 is thus pushed in the transverse direction into the cavity which is formed by the first chamfer 18 and the retaining element 22, and in the locking position is additionally jammed by the second chamfer 20.

Figure 2D:
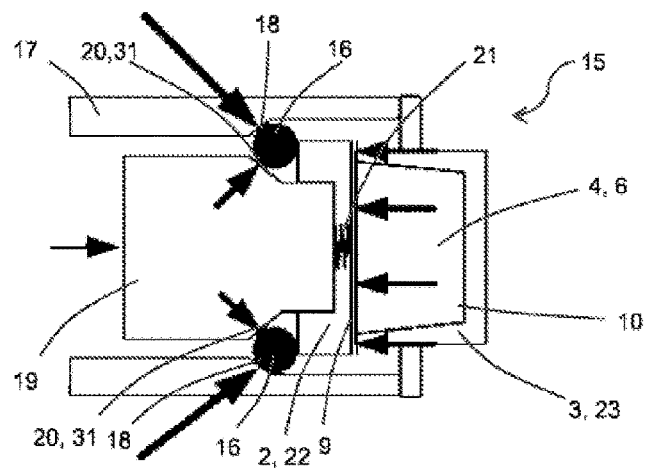

In FIG. 2d the locking mechanism 15 is illustrated during the brewing operation. The locking mechanism 15 is located in the locking position, such that the forces which are created on account of the high extraction pressure during the brewing operation are transmitted via the displacing element 19 to the latch and thus to the wall part 17 which is fixedly connected to the brewing apparatus 1. The drive mechanism 12 and, in particular, the toggle lever joint 13 here are only very lightly stressed in comparison with the prior art.

Figure 2E:
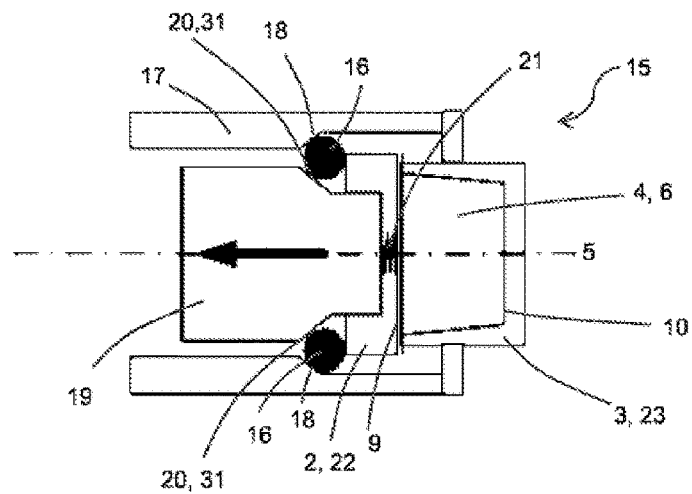

In FIG. 2e it is illustrated that the first and the second brewing chamber element 3 are located in the extracting position, and the locking mechanism 15 is in the locking position, wherein, however, the high extraction pressure has dissipated in the interior of the brewing chamber 6 after the brewing operation. In the event of a subsequent movement of the displacing element counter to the axial direction 5 and in relation to the retaining element 22, the latch 16 is moved from the first chamfer 18 in the transverse direction back into the releasing position.

Figure 2F:
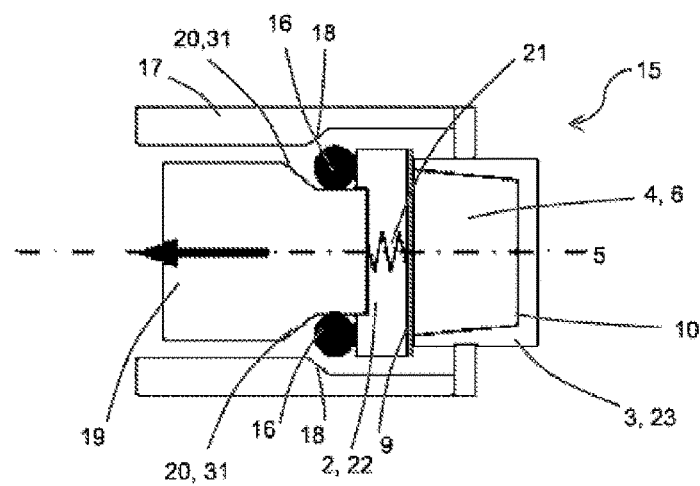

In FIG. 2f the first brewing chamber element 2 and the second brewing chamber element 3 are illustrated in the extracting position, wherein a substantially closed brewing chamber 6 is formed. The locking mechanism 15, in contrast, is in the releasing position. The latch 16 is here displaceably disposed in particular in the transverse direction in a cavity which is formed by the first chamfer 18, the second chamfer 20, and the retaining element 22. This situation corresponds to the arrangement illustrated in FIG. 2c, but with the difference that a subsequent movement of the first brewing chamber element 2 counter to the axial direction 5 is performed, in order to guide back the brewing apparatus 1 into a loading position.

Figure 2G:
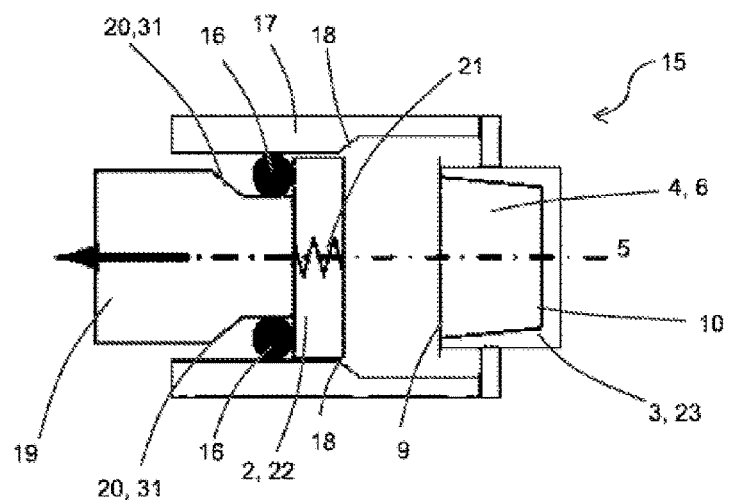

In FIG. 2g the brewing apparatus 1 is illustrated so as to correspond to FIG. 2a, in a partially opened position between the extracting position and the loading position. The locking mechanism 15 is located in the releasing position, such that the latch 16 is displaceably disposed counter to the axial direction 5. In the event of this movement back into the loading position, the latch 16 is pushed into motion counter to the axial direction 5 by the retaining element 22. The ball-shaped or roller-shaped shape of the latch 16 here enables particularly easy and simple displacement of the first brewing chamber element 2, in particular on account of the negligible rolling friction of the latch 16. In the event of the movement of the first brewing chamber element 2, from the extracting position into the loading position, the portion capsule 4 is initially entrained on the capsule flange (not illustrated) by gripper arms and subsequently falls out of the brewing apparatus 1.

Figure 3:
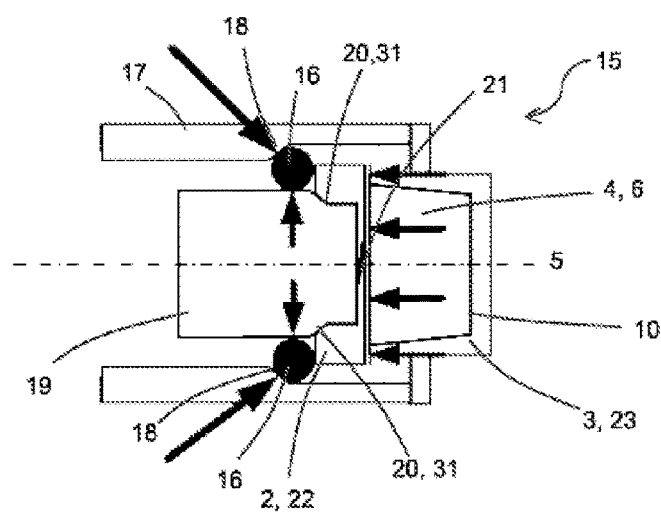
FIG. 3 shows a schematic view of a locking mechanism according to a third embodiment of the present invention.

In FIG. 3 a schematic view of a locking mechanism 15 according to a third embodiment of the present invention is illustrated. The latch 16, according to the third embodiment of the locking mechanism 15, in the locking position is merely jammed between the first chamfer 18, a second wall 31 of the displacing element 19, and the retaining element 22. On account thereof, it is advantageously possible for the forces which are created on account of the extraction pressure prevailing in the brewing chamber during the brewing operation to be transmitted exclusively to the wall part 17 which is fixedly connected to the brewing apparatus 1, and to thus completely relieve the drive mechanism 12.

In FIGS. 4a to 4e schematic views of a locking mechanism 15 according to a fourth embodiment of the present invention are illustrated. The locking mechanism 15 according to the fourth embodiment of the present invention displays a first brewing chamber element 2 which is movable along the axial direction, an opening 35, 35' of the wall part 17, and a blocking element 36, 36'. The first brewing chamber element comprises a piston 37 which is connected to the drive mechanism 12 and is movable along the axial direction, a latch 16, 16' which is disposed on a first end so as to be rotatable with the piston about a connecting point 33, 33', and which displays a sliding face 38 which contacts a guiding face 39 of the displacing element 19. The sliding face 38 of the latch is disposed in such a manner that in the event of a movement of the piston 37 in the axial direction 5, the sliding face 38 of the latch 16, 16' is displaced along the guiding face 39 of the displacing element 19. The opening 35, 35', for example in the form of a gap, a clearance, or a cavity of the wall part 17 which is formed in an arbitrary manner, is disposed in such a manner that the latch 16, 16', in the locking position, engages with a second end of the latch 16, 16' in the opening 35, 35'. The blocking element 36, 36' is disposed close to the opening 35, 35' and is fixedly connected to the wall part 17, in order to block a movement of the first brewing chamber element 2, in particular of the displacing element 19, during the brewing operation. The latch 16, 16' in the locking position, along its main plane of extent, is in planar contact with the displacing element 19, such that a force on account of high extraction pressure within the brewing chamber during the brewing operation is particularly well absorbed by the latch 16, 16', and can be transmitted via the blocking element 36, 36' to the wall part 17. On account thereof, the drive mechanism 12 is relieved in a particularly advantageous way, on account of which a cost-effective brewing apparatus in comparison with the prior art can be provided.

In FIG. 4a the locking mechanism 12 of the brewing apparatus 1 is illustrated in the loading position, wherein the latch 16, 16', in relation to the axial direction 5, is in an angled position and the portion capsule 4 is located outside an opened brewing chamber 6. The latch 16, 16' bears on the blocking element 36, 36', such that a movement of the first brewing chamber element 2 out of the loading position, counter to the axial direction 5, is blocked. A movement of the piston along the axial direction 5, out of the loading position, in contrast leads to rotation of the latch 16 about an axis which runs perpendicularly to the axial direction 5 through the connecting point 33. The latch 16, 16' here is disposed in such a manner that said latch 16, 16' can be pivoted from a position in the releasing position, which is angled in relation to the axial direction 5, into a direction which is substantially perpendicular to the axial direction 5 in the extracting position.

In FIG. 4b the locking mechanism 12 of the brewing apparatus 1 is illustrated after an initial movement of the piston 37 in the axial direction 5. On account of the movement of the piston 37, rotation of the latch 16, 16' about the axis running perpendicularly to the axial direction 5 through the connecting point 33, 33' is caused, such that the movement of the sliding face 38 of the latch 16, 16' along the guiding face 39 of the displacing element 19 takes place in the direction of the opening 35, 35'. During this movement the displacing element 19 is displaced in the axial direction 5, in order for the portion capsule 4 to be pushed into the brewing chamber 6.

In FIG. 4c the locking mechanism 12 of the brewing apparatus 1 is illustrated in the releasing position, wherein the brewing chamber 6 is closed by the displacing element 19 and additionally by means of a sealing element 34, in particular in the form of a seal ring, and thus forms a substantially closed brewing chamber 6. A further movement of the piston 37 in the axial direction 5 has the effect of transferring the locking mechanism into the locking position, since the displacing element 19 bears on a receiving element 23 of a second brewing chamber element 3, such that a further movement of the displacing element 19 in the axial direction is blocked by the receiving element 23.

Figure 4D:
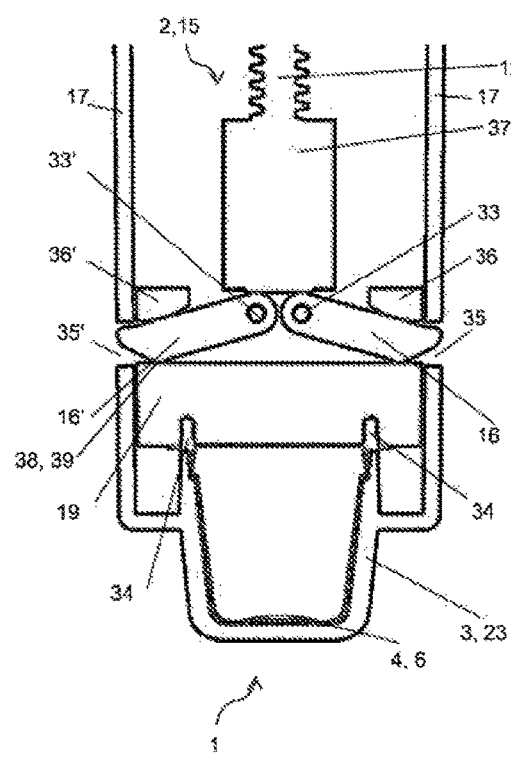

In FIG. 4d the locking mechanism 12 of the brewing apparatus 1 is illustrated in a position between the releasing position and the locking position, wherein the brewing chamber 6 is closed by the displacing element 19 in such a manner that a substantially closed brewing chamber 6 is formed. On account of the blockage of the movement of the displacing element 19 in the axial direction 5, displacement of the sliding face 38 of the latch 16, 16' perpendicular to the axial direction toward the opening 35, 35' is caused. Here, the latch 16, 16' is additionally guided by a further, preferably curved, guiding face which is further disposed on the blocking element 36, 36', wherein the second end of the latch 16, 16' is moved in the direction of the opening 35, 35'. In the event of a movement of the piston 37 in the axial direction 5 out of the releasing position, additional pressure is built up via the displacing element 19 on the substantially closed brewing chamber 6, such that the latter is in particular hermetically closed. On account thereof, in particular, leakage of the brewing chamber 6 during the brewing operation is prevented in a particularly simple way and a particularly tight brewing chamber 6 and a particularly stable brewing apparatus 1 are provided.

Figure 4E:
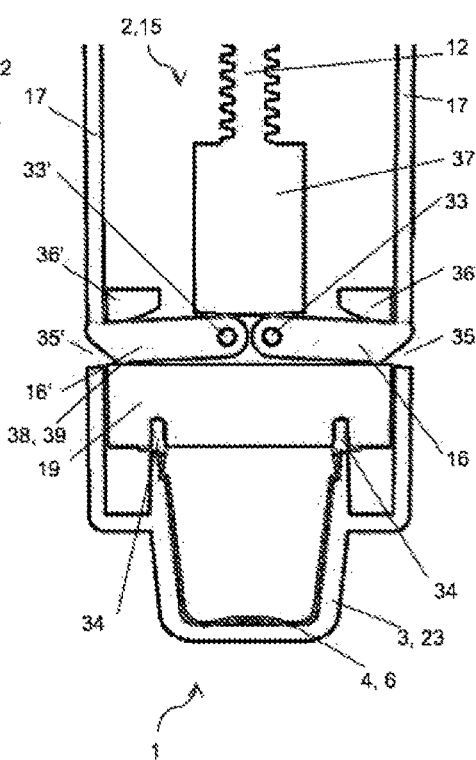

In FIG. 4e the locking mechanism 12 of the brewing apparatus 1 is illustrated in the locking position, wherein the brewing apparatus 1 is located in the extracting position and the brewing chamber 6 is substantially closed and, in the extracting position, is in particular hermetically closed and locked. In the locking position the latch 16, 16' engages in the opening 35, 35' of the wall part 17 and, in particular in relation to a main plane of extent of the latch 16, 16', is aligned so as to be substantially perpendicular to the axial direction 5. Furthermore, the latch is disposed between the displacing element 19 and the blocking element 36, 36' in such a manner that a movement of the displacing element counter to the axial direction 5 out of the extracting position is blocked. On account thereof it is advantageously possible for the brewing chamber 6 during the brewing operation to be impinged with a high extraction pressure in comparison with the prior art and to thereby hermetically close the brewing chamber. On account thereof, coffee beverages of particularly good quality, in particular espresso, can be produced, for example. Furthermore, the high extraction pressure prevailing in the interior of the hermetically closed brewing chamber 6 is transmitted in a particularly efficient way to the latch 16, 16' which bears in a planar manner on the displacing element 19. The extraction pressure here is transmitted from the latch 16, 16' to the blocking element 36, 36' and in particular in part to the piston 37, and absorbed by the blocking element 36, 36' which is fixedly connected to the wall part 17 of the brewing apparatus 1. On account thereof, the drive mechanism is relieved, by way of which material and production costs can be further lowered on account of the lower requirements placed on the drive mechanism.

Figure 5A:
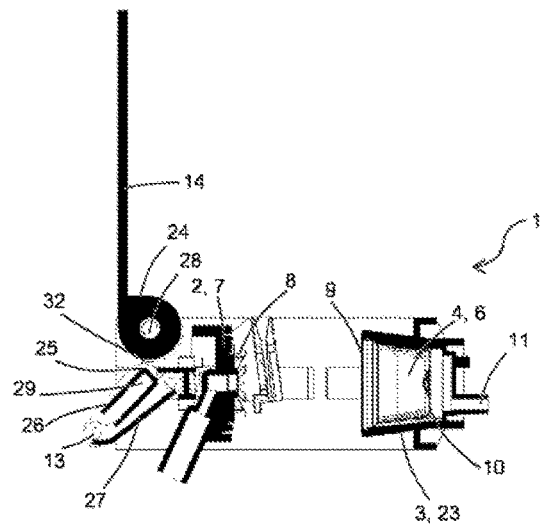
FIGS. 5a to 5d show schematic views of a drive mechanism according to an embodiment of the present invention.
Figure 5B:
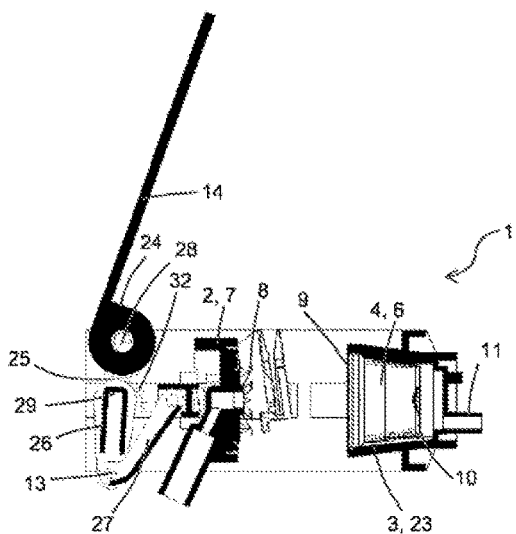
Figure 5C:
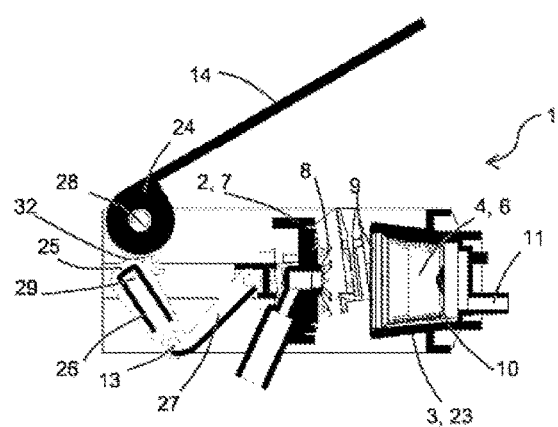

In FIGS. 5a to 5c schematic views of a drive mechanism 12 according to an embodiment of the present invention are illustrated. The drive mechanism 12 displays a hand lever 14 having a first coupling part 24, and a toggle lever joint 13 having a second coupling part. The first coupling part 24 of the hand lever 14 is connected to the brewing apparatus 1 so as to be rotatable about a first connecting axle 28, and the second coupling part 25 of the toggle lever joint 13 is connected to the brewing apparatus 1 so as to be rotatable about a second connecting axle 29. Force-gearing from the hand lever 14 via the first coupling part 24 to the second coupling part 25 here takes place by means of a gear wheel connection 32 which is disposed between the first and second coupling part 25. Advantageously, a gear wheel connection 32 which is configured to be form-fitting in such a manner leads to a particularly stable connection, in particular without slippage, between the first coupling part 24 and the second coupling part 25. The toggle lever joint 13 displays a first toggle lever 26 which on a first side is connected to the second coupling part 25, and on a second side is rotatably connected to a second toggle lever 27. The second toggle lever 27, in turn, on a further second side is displaceably disposed along the axial direction 5 and preferably connected to the first brewing chamber element 2. On account thereof, it is advantageously possible for a movement of the hand lever 14 to be geared into a rapid movement of the first brewing chamber element 2, using as little effort in force as possible.

The length of the first toggle lever 26 preferably is a length between 1 and 50 cm, very preferably a length between 10 and 30 cm, and very particularly preferably a length of approx. 22 cm. The length of the second toggle lever 27 preferably is a length between 1 and 50 cm, very preferably a length between 20 and 40 cm, and very particularly preferably a length of approx. 31 cm. The first toggle lever 26 is connected to the second toggle lever 27 so as to be rotatable about an axle, wherein the rotation of the first toggle lever 26 about the second connecting axle 29, in order to transfer the toggle lever joint 13 from the buckling position into the extended position, preferably is between 80 and 300 degrees, very preferably between 120 and 160 degrees, and very particularly preferably approx. 137 degrees.

In FIG. 5a the brewing apparatus 1 is illustrated in a loading position, wherein the hand lever 14 is located in an opened position and the toggle lever joint 13 is in a buckling position. The hand lever 14 displays a main direction of extent which, in the opened position of the hand lever 14, extends substantially perpendicular to the axial direction 5, in particular perpendicular to the main plane of extent of the brewing apparatus 1.

In FIG. 5b the brewing apparatus 1 is illustrated in a position between the loading position and the extracting position. In the event of a closure movement of the hand lever 14, the hand lever 14 is rotated about the first connecting axle 28, wherein by means of a gear wheel connection 32 the rotation movement of the first coupling part 24 is transmitted to the second coupling part 25. The first coupling part 24 preferably displays a larger radius than the second coupling part 25, such that gearing of the rotation movement of the first coupling part 24 to a rotation movement of the second coupling part 25 in a particularly advantageous way leads to a rapid rotation movement of the second coupling part 25, using a low effort in force.

In FIG. 5c the brewing apparatus 1 is illustrated in a further position between the loading position and the extracting position. While the hand lever 14 has been rotated only by a slight angle about the first connecting axle 28 in the direction of the closure position, on account of the faster rotation movement of the second coupling part 25 the first toggle lever 26 has been rotated about the second rotation axis by a larger angle in relation to the hand lever 14. On account thereof, a particularly rapid transfer of the toggle lever joint 13 from a buckling position into an extended position is achieved, on account of which the first brewing chamber element 2 which is connected to the toggle lever joint 13 is movable from the loading position into an extracting position at particularly high speed.

Figure 5D:
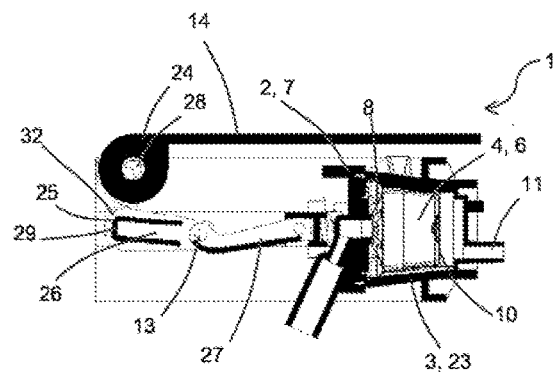

In FIG. 5d the brewing apparatus 1 is illustrated in the extracting position. The hand lever 14, in the closure position, here is aligned having the main direction of extent substantially parallel with the brewing apparatus 1 and along the axial direction 5.

The toggle lever joint 13 is transferred into the extended position, on account of which the first brewing chamber element 2 contacts the second brewing chamber element 3 and forms a substantially closed brewing chamber 6.

In FIGS. 6a to 6e, schematic views of a locking mechanism 15 according to a fifth embodiment of the present invention are illustrated. The locking mechanism 15 according to the fifth embodiment of the present invention displays a first brewing chamber element 2 which is displaceable along the axial direction 5, and a second brewing chamber element 3, wherein the first brewing chamber element 2 in the loading position is spaced apart from the second brewing chamber element 3 in such a manner, that a portion capsule 4 is insertable in a loading direction (not illustrated) which is perpendicular to the axial direction 5. The first brewing chamber element 2 is movable along the axial direction 5 into an extracting position, in order to form a substantially closed brewing chamber 6, in particular during the brewing operation, with the second brewing chamber element 3. Preferably, a perforating element 7 is configured on the first brewing chamber element 2 (see FIG. 1), which perforating element 7 has perforating tips 8 for perforating the capsule lid 9 of the portion capsule 4 and a water infeed duct for injecting an extraction fluid into the portion capsule 4 during the brewing operation. Preferably, a further perforating tip for perforating the capsule base 10, and a discharge duct for conveying away the extraction fluid which interacts with the beverage substance in the interior of the portion capsule 4 into a drinking vessel (not illustrated) are configured on the second brewing chamber element 3.

The drive mechanism 12 for moving the first brewing chamber element 2 from the loading position into the extracting position according to the fifth embodiment, as a drive element displays a toggle lever joint 13 having a first toggle lever 26 and a second toggle lever 27. The drive mechanism 12 preferably is actuatable by means of a not illustrated hand lever 14, wherein a first coupling part 24 of the hand lever 14, via a gear wheel connection 32, is in collaborative connection with the second coupling part 25 which is rotatably disposed on the wall part 17 of the brewing apparatus 1, in order to transmit a movement of the hand lever 14 to a movement of the toggle lever joint having the first toggle lever 26 and the second toggle lever 27. The second toggle lever preferably is movably connected to the first brewing chamber element 2, in order to cause a movement of the first brewing chamber element 2 between the loading position and the extracting position by means of the drive mechanism 12. The brewing apparatus 1 according to the fifth embodiment furthermore displays a separate locking mechanism 15 for locking the brewing chamber 6 in the extracting position. The locking mechanism 15 displays a displacing element 19 which is also referred to as the piston 37, a retaining element 22 which is movable along the axial direction 5 in relation to the displacing element 19 and elastically connected by means of a return spring 21 to the displacing element 19, and a latch 16.

The latch 16, at a connecting point 33, is rotatably connected to the retaining element 22 of the first brewing chamber element 2 and in a releasing position, in particular in the loading position, is displaceably disposed along the axial direction 5 in the region of the wall part 17 of the brewing apparatus 1. The latch 16 furthermore is configured for engaging in an opening 35 of the wall part 17 and/or for locking with at least one blocking element 36 in a locking position, which is disposed on the wall part 17 of the brewing apparatus and fixedly connected to the wall part 17.

The displacing element 19 displays a guiding face 39 having a first guiding side 39' (illustrated in FIG. 6a) and a second guiding side 39" (illustrated in FIG. 6a), wherein the first guiding side 39' in the releasing position bears on the latch 16 and displays a first main plane of extent which is disposed so as to be perpendicular to the axial direction 5 and perpendicular to the loading direction. The second guiding side 39" of the guiding face 39 of the displacing element 19 displays a second main plane of extent which is disposed so as to be parallel with the axial direction and perpendicular to the loading direction. The second main plane of extent of the second guiding side 39" particularly preferably is spaced apart parallel with a further main plane of extent of a wall 30 of the wall part 17 of the brewing apparatus 1 and from the further main plane of extent in such a manner that the displacing element 19 generates a torque on the latch 16.

The latch 16 displays a sliding face 38 having a first sliding side 38' (illustrated in FIG. 6c) and a second sliding side 38" (illustrated in FIG. 6b), wherein the first sliding side 38' in the releasing position bears on the first guiding side 39' of the guiding face 39 of the displacing element 19 and is disposed so as to be parallel with the first guiding side 39', and wherein the second sliding side 38" is disposed so as to be parallel with the second guiding side 39", parallel with the wall 30 of the wall part 17, and to slide on the wall 30 of the brewing apparatus 1.

Figure 6A:
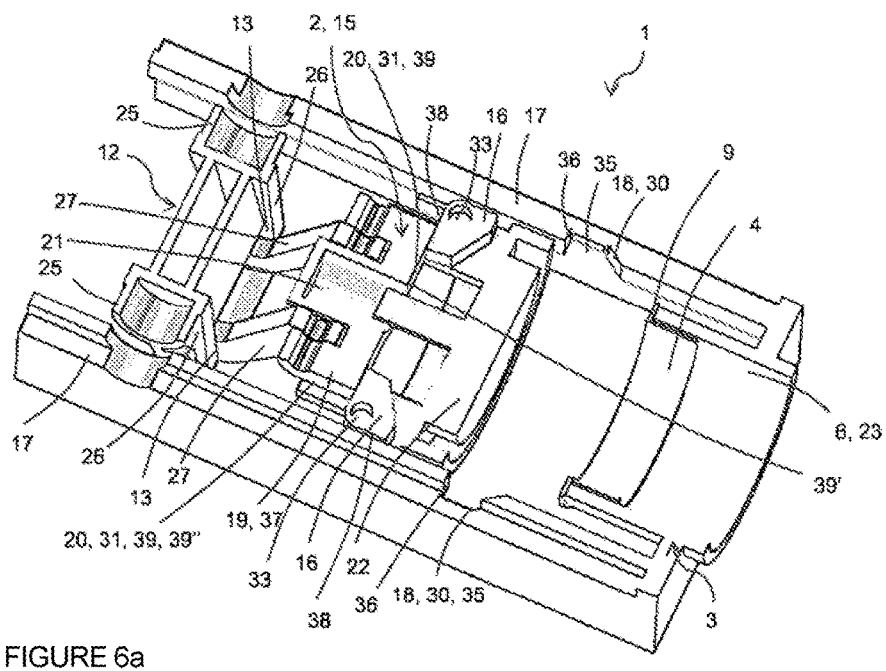
FIGS. 6a to 6e show schematic views of a locking mechanism according to a fifth embodiment of the present invention.

In FIG. 6a the locking mechanism 15 of the brewing apparatus 1 is illustrated in the loading position. The first brewing chamber element 2 in the loading position preferably is spaced apart from the second brewing chamber element 3 in such a manner that simple insertion of the portion capsule 4 in the loading direction is possible. The latch 16 in the loading position, on account of the displacing element 19 bearing on the first sliding side 38' of the sliding face 38 and/or of the connection at the connecting point 33, is conjointly moved with the first brewing chamber element 2 along the axial direction in the event of a movement. In the event of a movement of the first brewing chamber element 2 along the axial direction, the latch 16 which is located in the releasing position does not carry out a rotation movement about the connecting point 33. In particular, in the event of a displacement of the first brewing chamber element 2 along the axial direction 5, on account of the alignment of the second sliding side 38" of the latch 16 parallel with the further main plane of extent of the wall 30 of the wall part 17 and on account of the arrangement of the second sliding side 38" of the latch 16 to slide on the wall 30 of the wall part 17, a rotation movement of the latch 16 about the connecting point 33 is blocked.

Figure 6B:
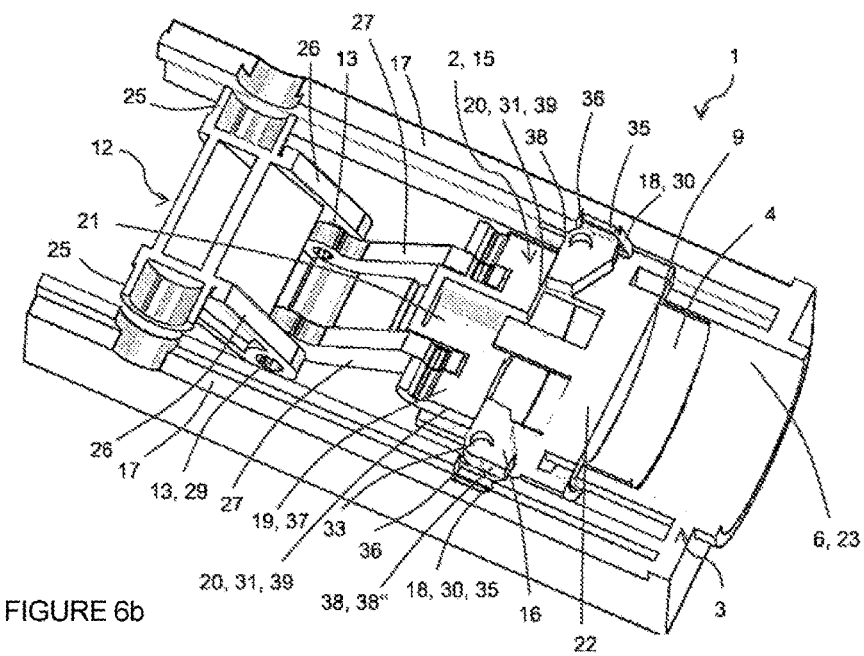

In FIG. 6b the locking mechanism 15 of the brewing apparatus 1 is illustrated after an initial movement of the piston 37 in the axial direction 5. The latch 16 is still located in the releasing position, wherein the first sliding side 38' of the sliding face 38 of the latch 16 bears on the first guiding side 39' of the guiding face 39 of the displacing element 19 and is aligned parallel therewith. The first brewing chamber element 2 and the second brewing chamber element 3 are located in the extracting position and form a substantially closed brewing chamber 6. Here, the retaining element 22 of the first brewing chamber element 2 bears on the capsule lid 9 and/or the receiving element 23 of the portion capsule 4 in such a manner that a further movement of the retaining element 22 in the axial direction 5 is caused by a relative movement of the displacing element 19 toward the retaining element 22 which is connected by means of the return spring 21. The first guiding side 39' of the guiding face 39 of the displacing element 19 bears on the first sliding side 38' of the sliding face 38 of the latch 16 in such a manner that in the event of a further movement of the displacing element 19 in the axial direction 5, the displacing element 19 generates a torque on the latch 16. A further movement of the displacing element 19 or of the piston 37, respectively, along the axial direction 5 from the loading position into the extracting position thus leads to a rotation movement or a pivoting movement, respectively, of the latch 16 about an axis which runs perpendicularly to the axial direction 5 through the connecting point 33.

On account of the further movement of the displacing element 19, rotation of the latch 16 about the axis running perpendicularly to the axial direction 5 through the connecting point 33 is caused, wherein the first sliding side 38' of the sliding face 38 of the latch 16 slides on the first guiding side 39' of the guiding face 39 of the displacing element 19 of the first brewing chamber element 2, and the second sliding side 38" of the sliding face 38 of the latch 16 is pivoted in the direction of the opening 35 into a locking position.

Figure 6C:
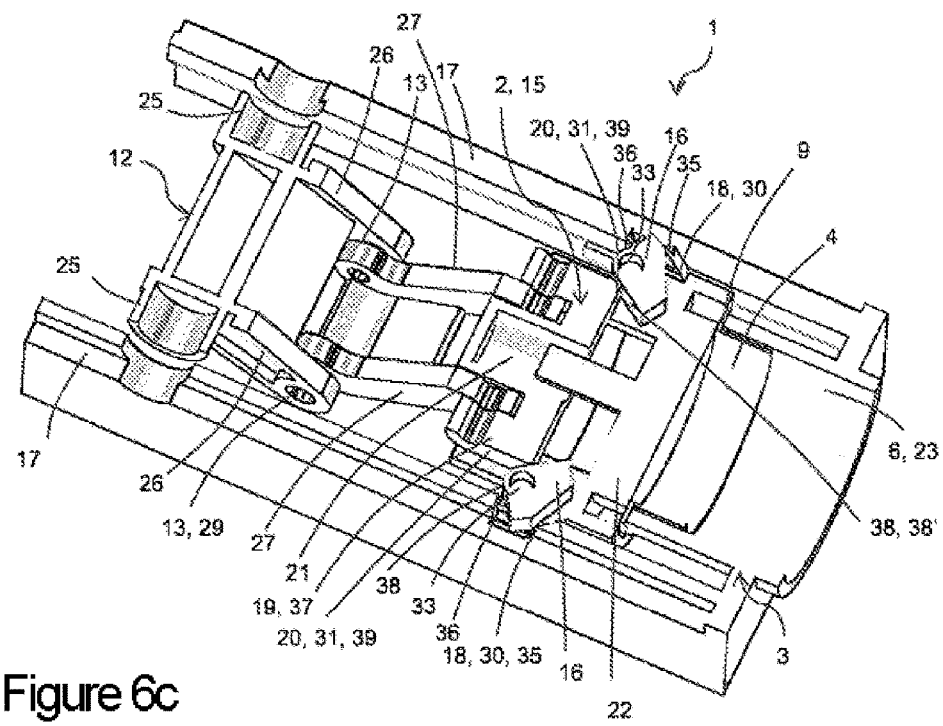
Figure 6D:
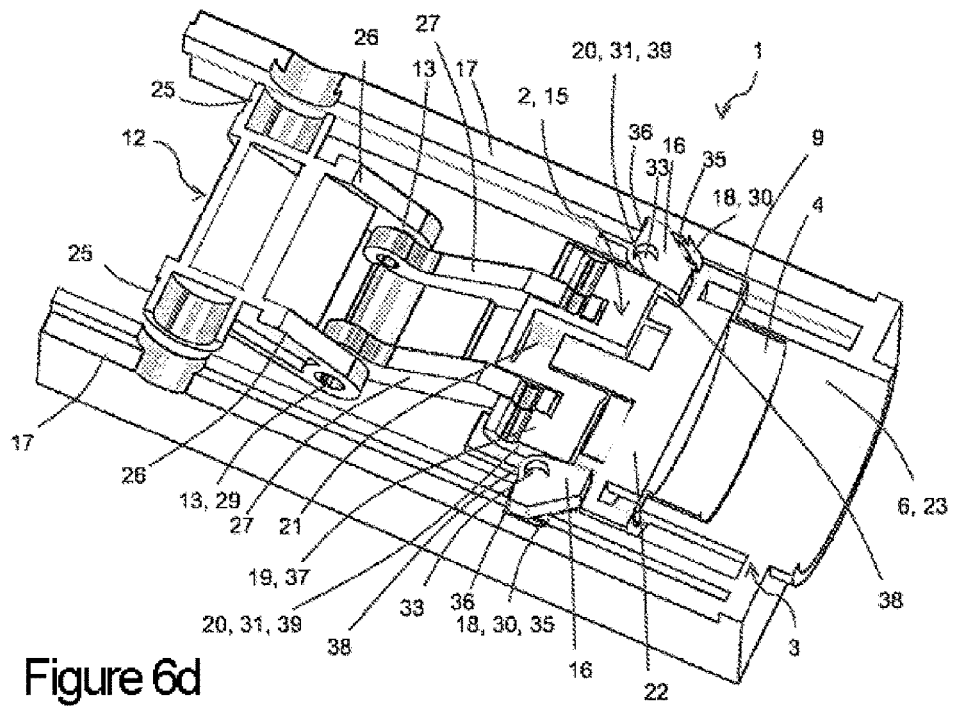

In FIG. 6c the locking mechanism 15 of the brewing apparatus 1 is illustrated between the releasing position and the locking position, wherein the brewing chamber 6 is closed by the retaining element 22 and thus forms a substantially closed brewing chamber 6. A further movement of the displacing element 19 in the axial direction 5 causes a locking movement of the locking mechanism 15 into the locking position. The first guiding side 39' of the guiding face, or the corner region between the first guiding side 39' and the second guiding side 39" of the guide face 39 of the displacing element 19 slides during the locking movement on the first sliding side 38' of the sliding face 38 of the latch 16, until the second sliding side 38" of the sliding face of the latch bears on the blocking element 36. The second sliding side 38" of the sliding face 38 of the latch 16 here is displaced perpendicularly to the axial direction toward the opening 35. The latch 16 here is additionally guided by a further guiding face of a first chamfer 18 of the wall 30 of the wall part 17, which guiding face is further disposed in the region of the opening 35. In the event of a movement of the displacing element 19 in the axial direction 5 from the releasing position into the extracting position, an additional pressure is built up via the displacing element 19 on the substantially closed brewing chamber 6, such that the latter is in particular hermetically closed. On account thereof, leakage of the brewing chamber 6 during the brewing operation is prevented in a particularly simple way and a particularly tight and stable brewing apparatus 1 is provided In FIG. 6*d* the locking mechanism 15 of the brewing apparatus 1 is illustrated between the releasing position and the locking position, wherein the brewing chamber 6 is closed by the retaining element 22 and thus forms a substantially closed brewing chamber 6. A pivoting movement of the latch 16 about the connecting point 33 is blocked on account of the second sliding side 38" of the sliding face 38 of the latch 16 bearing on the blocking element 36. On account thereof, the latch 16 is located in the locking position. The displacing element 19 is disposed so as to be further displaceable in the axial direction, counter to the return force of the return spring 21, in relation to the latch 16 which bears on the receiving element 23 and is located in the locking position in relation to the opening 35, in order to transfer the toggle lever joint from a substantially angled position, wherein the first toggle lever 26 and the second toggle lever 27 form an angle of less than 180 degrees, preferably between 160 and 179 degrees, about the second connecting axle 29, into an extended position, wherein the angle between the first toggle lever 26 and the second toggle lever 27 about the second connecting axle 29 is particularly preferably exactly 180 degrees.

Figure 6E:
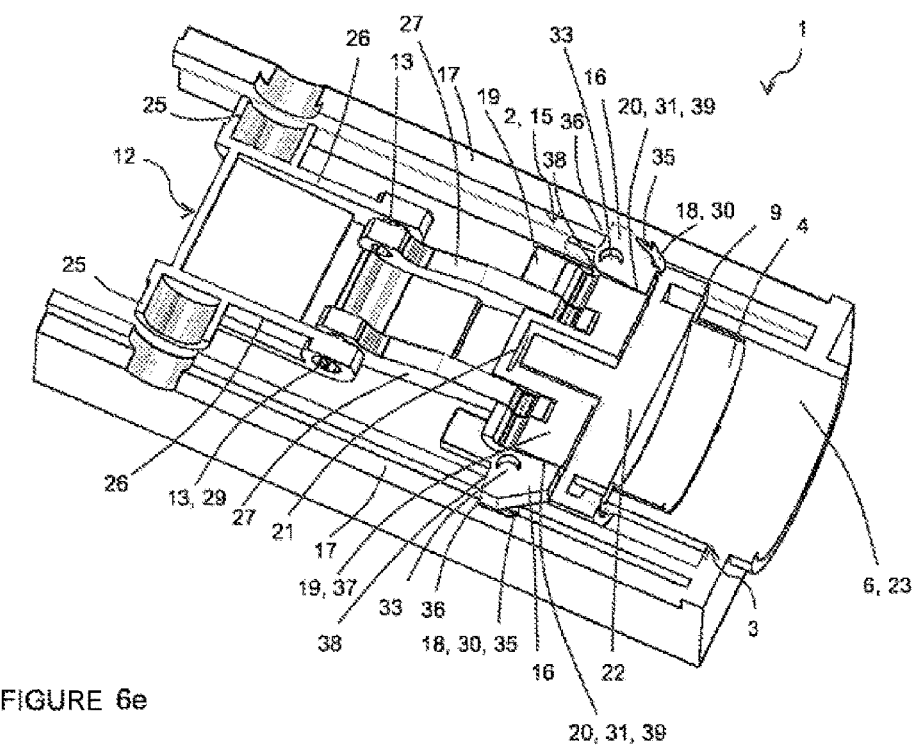

In FIG. 6*e* the locking mechanism 15 of the brewing apparatus 1 is illustrated in the locking position, wherein the brewing apparatus 1 is located in the extracting position and the brewing chamber 6 is substantially closed and in the extracting position is, in particular, hermetically closed and locked. In the locking position the latch 16 engages in the opening 35 of the wall part 17 and, with the second sliding side 38" of the sliding face 38, is aligned so as to be substantially perpendicular to the axial direction 5. The toggle lever joint 13 in an extended position furthermore is disposed in such a manner that a movement of the displacing element counter to the axial direction 5, out of the extracting position, is blocked by the drive element, in particular by the toggle lever joint 13. On account thereof, it is advantageously possible for the brewing chamber 6 to be impinged with a high extraction pressure in comparison to the prior art during the brewing operation, and thus for the brewing chamber 6 to be hermetically closed. On account thereof, coffee beverages of particularly good quality, in particular espresso, can be produced, for example.

Furthermore, the high extraction pressure prevailing in the interior of the hermetically closed brewing chamber 6 is transmitted via the retaining element 22 and the piston 37 or the displacing element 19, respectively, in a particularly efficient way to an axis of the drive element, which is formed by the first toggle lever 26, the toggle lever joint 13, and the second toggle lever 27, and to the latch 16 which with the second sliding side 38" of the sliding face 38 of the latch 16 bears in a planar manner on the blocking element 36. The extraction pressure here is in part transmitted from the latch 16 to the blocking element 36 and absorbed by the blocking element 36' which is fixedly connected to the wall part 17 of the brewing apparatus 1. The brewing apparatus 1 particularly preferably displays two latches 16 which are disposed on two opposite positions and which each compensate for a force which is perpendicular to the axial direction 5 and perpendicular to the loading direction. In the event of the locking mechanism 15 being unlocked, the toggle lever joint 13 is transferred back from the extended position into the buckling position, wherein the return force of the return spring 21 causes a movement of the displacing element 19 in relation to the retaining element 22, counter to the axial direction 5, and supports the unlocking movement, which is particularly advantageous for the user.

Figure 7A:
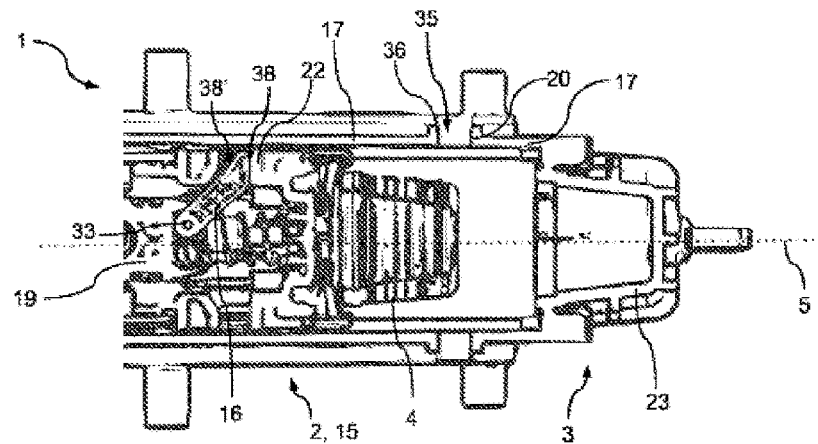
FIGS. 7a to 7b show schematic views of a locking mechanism according to a sixth embodiment of the present invention.
Figure 7B:
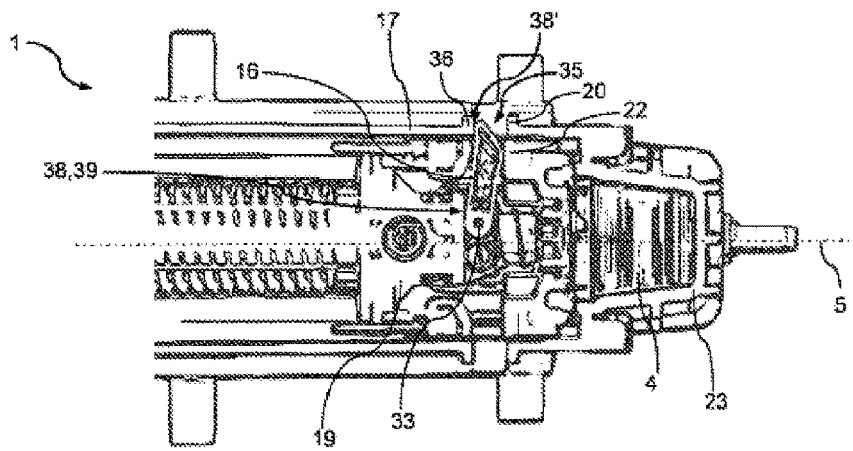

In FIGS. 7*a* to 7*b*, schematic views of a locking mechanism 15 according to a sixth embodiment of the present invention, which substantially corresponds to the fourth embodiment described in FIGS. 4*a* to 4*e*, are illustrated. The locking mechanism 15 according to the sixth embodiment of the present invention displays a first brewing chamber element 2 which is movable along the axial direction, an opening 35 of the wall part 17, and a blocking element 36. The first brewing chamber element 2 displays a latch 16 displaying a main direction of extent, which on a first end at a connecting point 33 is connected to the displacing element 19. The latch 16 here is pivotable about the connecting point 33.

In FIG. 7*a* the locking mechanism 15 is illustrated in the releasing position. The latch 16 displays a sliding face 38, wherein the sliding face 38 is provided for the latch 16 to slide along the retaining element 22. In the event of a movement of the displacing element 19 in the axial direction 5 in relation to the retaining element 22, the latch 16 slides along the retaining element in such a manner that a second end of the latch 16, which lies opposite the first end along the main direction of extent, is moved into the opening 35.

In FIG. 7*b* the locking mechanism 15 is illustrated in the locking position. Here, the second end of the latch 16 engages in the opening 35, such that the brewing chamber 6, which is formed by the first brewing chamber element 2 and the second brewing chamber element 3, is locked. The blocking element 36 here is provided for absorbing forces which are transmitted from the latch 16 to a wall part 17 of the brewing apparatus 1. For example, a force on account of a high extraction pressure within the brewing chamber 6 during the brewing operation is absorbed by the latch 16 and, via the blocking element 36, transmitted to the wall part 17.

Figure 8A:
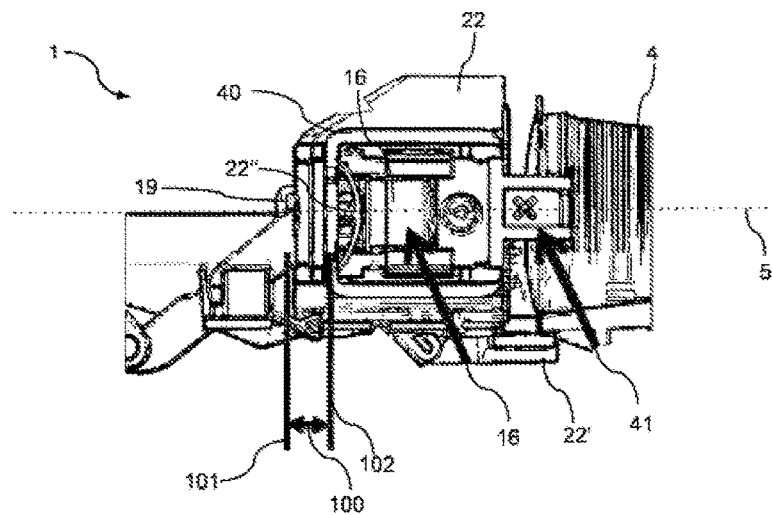
FIGS. 8a to 8b show schematic views of a locking mechanism according to a seventh embodiment of the present invention.
Figure 8B:
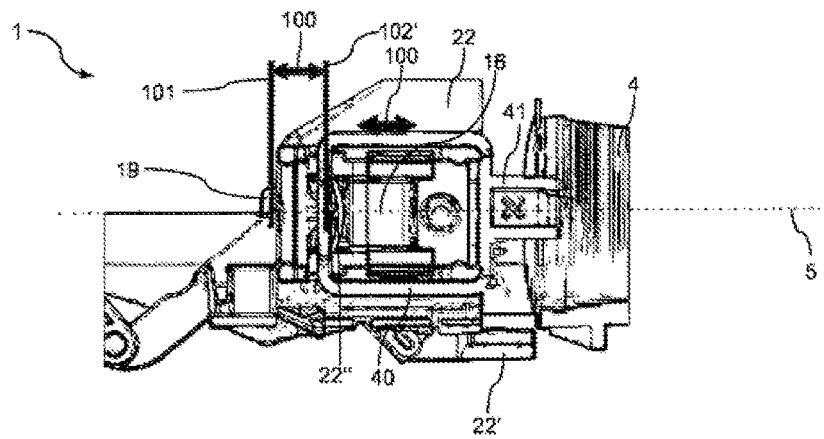

In FIGS. 8*a* to 8*b*, schematic views of a locking mechanism 15 according to a seventh embodiment of the present invention are illustrated. Here, a first brewing chamber element 2 is illustrated in a side view. Here, the portion capsule 4 bears on a retaining arm 22'; which here is fixedly connected to the retaining element 22. Here, the first brewing chamber element 2 displays a holding apparatus 40. The holding apparatus 40 here in particular comprises a further retaining arm 41 which is provided for holding the portion capsule 4 in its position which is assumed after charging the brewing apparatus 1. Here, the holding apparatus 40 is disposed so as to be movable in relation to the retaining element 22 by way of a return spring 22" which is fastened on the retaining element 22. Here, in an exemplary manner, a movement of the holding apparatus 40 along a direction of movement 100 which is parallel with the axial direction 5, relative to the retaining element 22, is indicated by an arrow 100, wherein the holding apparatus 40 is movable between a first holding position 101 and a second holding position 102. The holding apparatus 40 in particular is configured so as to at least in part surround the latch 16 in a frame-like manner. The holding apparatus 40 in particular is configured in such a manner that the latch 16 is inwardly and outwardly pivotable in a transverse direction which runs perpendicularly to a main plane of extent of the holding apparatus 40 and to the axial direction 5. In FIGS. 8*a* and 8*b* two potential positions of the holding apparatus 40 in relation to the retaining element 22 are in each case illustrated, wherein in FIG. 8*b* the holding apparatus is disposed in a further second holding position 102', wherein the spacing between the first holding position 101 and the further second holding position 102' along the axial direction 5 is larger than the spacing between the first holding position 101 and the second holding position 102 illustrated in FIG. 8a.

In FIGS. 9a to 9e, schematic views of a locking mechanism 15 according to an eighth embodiment of the present invention are illustrated. Here, the brewing apparatus 1 comprises a first brewing chamber element 2 and a second brewing chamber element 3, wherein here the first brewing chamber element 2 is movable in relation to the second brewing chamber element 3, along the axial direction 5 from the loading position, in which the first brewing chamber element 2 and the second brewing chamber element 3 are spaced apart from one another, into an extracting position, in which the first brewing chamber element 2 and the second brewing chamber element 3 form a substantially closed brewing chamber 6. A receiving element 23 for receiving a portion capsule 4 in the extracting position in particular is disposed on the second brewing chamber element 3. The brewing apparatus 1 here displays a drive mechanism 12 for moving the first brewing chamber element 2. The brewing apparatus 1 here displays a separate locking mechanism 15 for locking the brewing chamber 6 in the extracting position. Here, the locking mechanism 15 is transferable from a releasing position into a locking position for locking the brewing chamber 6 in the extracting position. The locking mechanism 15 in particular comprises at least two latches 16 which are disposed on opposite sides along a transverse direction—here being parallel with the drawing plane—which is perpendicular to the axial direction 5. Alternatively, the locking mechanism displays exactly one, three, four or more latches 16, wherein the latches 16 are in each case identically configured. In the following, the locking mechanism is described in an exemplary manner by means of such a latch 16. Here, the latch 16 in particular is substantially configured in such a manner that the latch 16 is connected to the first brewing chamber element 2, in particular the retaining element 22, so as to be pivotable about a connecting point 33.

Figure 9A:
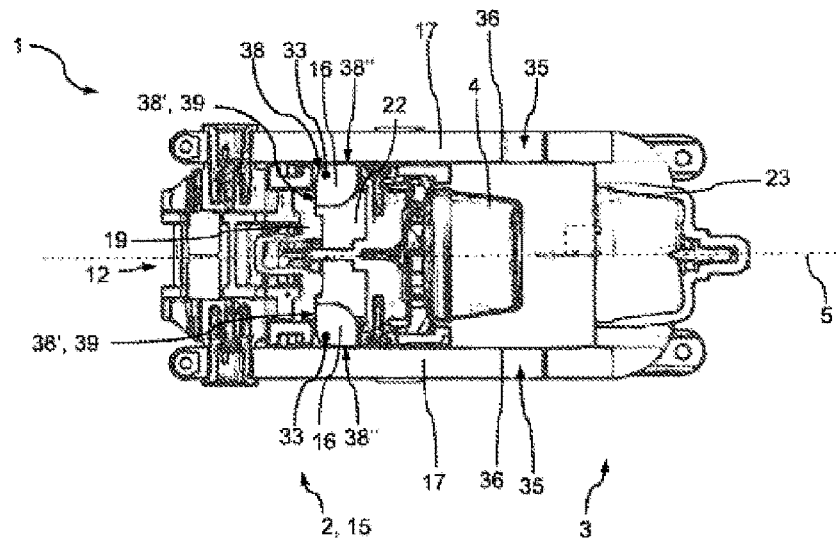
FIGS. 9a to 9e show schematic views of a locking mechanism according to an eighth embodiment of the present invention.

In FIG. 9a the brewing apparatus 1 is illustrated in the releasing position, wherein in particular the portion capsule 4 is already disposed in the brewing apparatus 1. Here, the first brewing chamber element 2 displays a retaining element 22 and a displacing element 19, wherein the retaining element 22 and the displacing element 19 are elastically interconnected, in particular by means of a return spring 21 (not illustrated), and wherein the retaining element 22 is displaceable along the axial direction 5 in relation to the displacing element 19. Here, the latch 16 is connected to the first brewing chamber element 2 in particular at a connecting point 33. In particular, the latch 16 is disposed in relation to the first brewing chamber element 2 so as to be pivotable about a pivot axis which runs through the connecting point 33. The pivot axis preferably is disposed so as to be perpendicular to the axial direction 5. The latch 16 preferably is connected to the retaining element 22 via the connecting point 33. The latch 16 in the releasing position is displaceable together with the first brewing chamber element 2 along the axial direction 5, between the first brewing chamber element 2 and the wall part 17. Here, the latch displays a sliding face 38, wherein in particular in the event of a movement of the first brewing chamber element 2 between the loading position and the extracting position along the axial direction 5, the sliding face 38 is substantially in collaborative contact with the wall part 17 in such a manner that the latch 16 is inwardly pivoted. Here, the sliding face 38 comprises a first sliding side 38' and a second sliding side 38", wherein in particular the second sliding side 38" displays a main plane of extent which, in the releasing position, is disposed so as to be substantially parallel with a main direction of extent of the wall part 17, in particular parallel with the axial direction 5. Here, an opening 35 is disposed on the wall part 17, wherein the opening 35 in particular is provided for receiving an outwardly pivoted latch 16 in the locking position, such that the brewing chamber 6 is hermetically lockable by means of the latch 16 which is in collaborative contact with a blocking element 36 in the extracting position. Here, the blocking element 36 is configured as a wall of the wall part 17 in the region of the opening 35. Here, the portion capsule 4 is displaced along the axial direction 5, from the first brewing chamber element 2 into the receiving element 23 of the second brewing chamber element 3, until the first brewing chamber element 2 and the second brewing chamber element 3 bear on one another and form the brewing chamber 6.

Figure 9B:
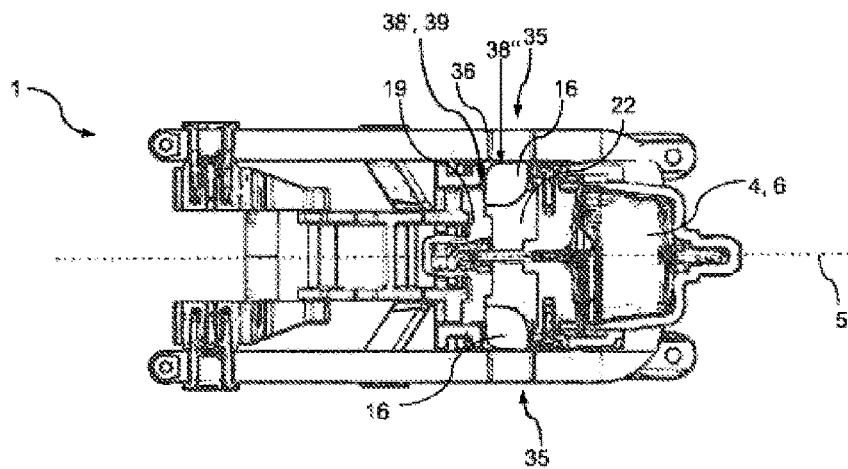

In FIG. 9b the first brewing chamber element 2 and the second brewing chamber element 3 form a brewing chamber 6 in which the portion capsule 4 is disposed. Here, the locking mechanism 15 is illustrated in the releasing position. In particular, the latch 16 here is disposed in a region of the opening 35 of the wall part 17, when the first brewing chamber element 2 bears on the second brewing chamber element 3. Here, the main plane of extent of the second sliding side 38" is disposed so as to be substantially parallel with the axial direction 5 or parallel with the main direction of extent of the wall 17, respectively. The latch here in particular is disposed in the region of the opening 35 in such a manner that the latch 16 is inwardly pivotable into the opening 35 of the wall part 17—i.e. outwardly pivotable—in a transverse direction which is perpendicular to the axial direction 5. On account of a locking movement of the first brewing chamber element 2 along the axial direction 5—i.e. toward the second brewing chamber element 3—the latch is subsequently inwardly pivoted into the opening 35—i.e. pivoted in.

Figure 9C:
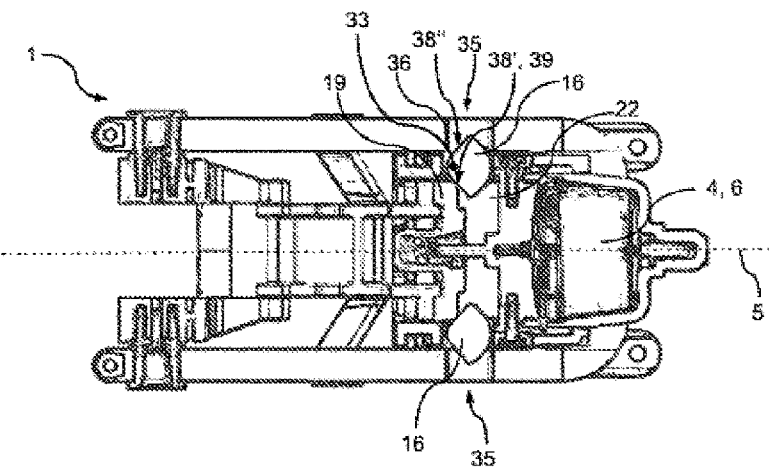

In FIG. 9c the locking mechanism 15 is illustrated during the transition from the releasing position into the locking position. Here, the latch 16 during the locking movement is pivoted in relation to the retaining element 22 by means of a relative movement of the displacing element 19. By means of this relative movement a torque is generated in particular, such that pivoting of the latch 16 into the opening 35 is caused. Here, the displacing element 19 displays a guiding face 39, wherein the guiding face 39 during the relative movement is in collaborative contact with the first sliding side 38' of the latch 16. Here, the latch 16 in particular is pivoted so long until the second sliding side 38" of the sliding face 38 of the latch 16 impacts on the blocking element 36.

Figure 9D:
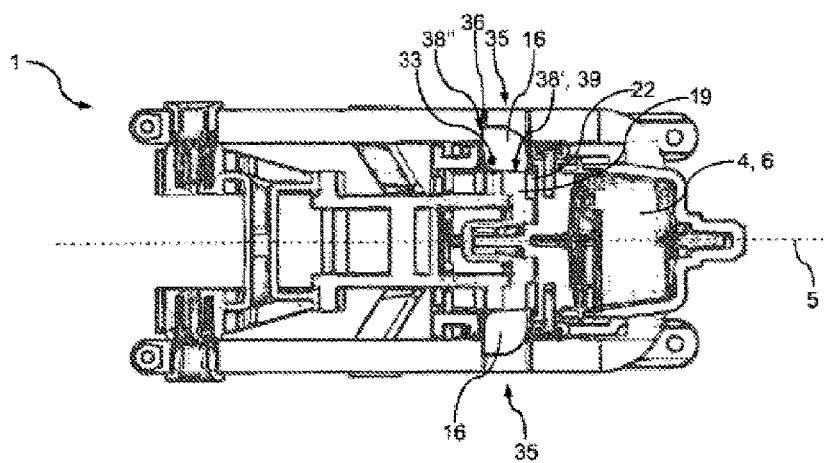

In FIG. 9d the locking mechanism 15 is illustrated in the locking position, wherein the second sliding side 38" bears on the blocking element 36. Here, the latch 16 is configured in such a manner that the latch 16 in the locking position is jammed between the displacing element 19 and the blocking element 36 in the opening 35. In particular, the latch 16 here in the plan view displays a shape of a circle sector, wherein the connecting point 33 is disposed so as to be substantially in the region of the center point 33 of the circle sector, wherein substantially here a first radius of gyration 38' is formed by the first sliding side 38' and a second radius of gyration 38" is formed by the second sliding side 38". In particular, an angle which is enclosed between the first radius of gyration 38' and the second radius of gyration 38"

is preferably between 45 and 135 degrees, particularly preferably between 70 and 110 degrees, and very particularly preferably about 90 degrees. In the extracting position, the locking mechanism 15 here is simultaneously located in the locking position, wherein the brewing chamber 6 is hermetically sealed and locked.

Figure 9E:
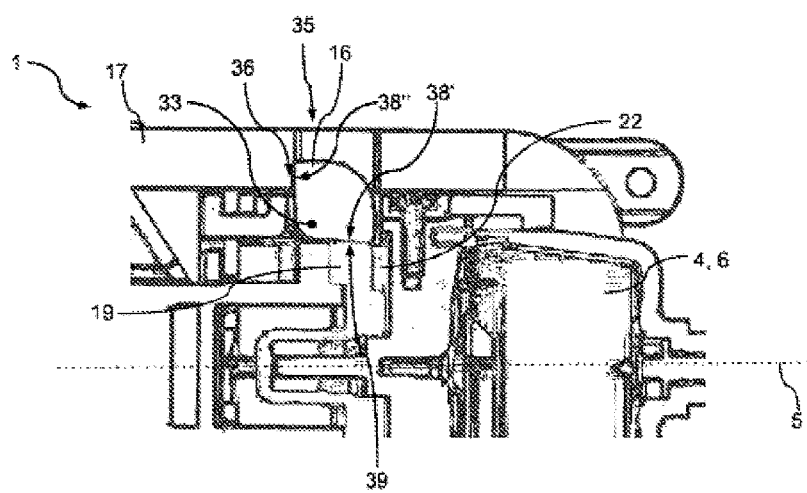

In FIG. 9e the brewing apparatus 1 is illustrated in the extracting position, wherein the locking mechanism displays the locking position. FIG. 9e is substantially an enlarged view of FIG. 9d. In the locking position, the latch 16 here is jammed between the displacing element 19 and the blocking element 36 in such a manner that the latch 16, which is pivotable about the connecting point 33, transmits a force which emanates from the displacing element 19 in the transverse direction which is perpendicular to the axial direction 5, via the blocking element 36, to the wall part 17 of the brewing apparatus 1. Here, in particular on account of the displacing element 19 which on the guiding face 39 is in collaborative contact with the first sliding side 38', reverse pivoting of the latch 16 out of the opening 35 is prevented. In the event of an unlocking movement—for example after the completion of a brewing operation—the displacing element 19 is initially moved in relation to the retaining element 22 along the axial direction 5, away from the second brewing chamber element 3, such that the latch 16 is again pivotable back out of the opening 35. Subsequently, the latch 16 is conjointly moved with the retaining element 22, first by a movement of the first brewing chamber element 2 into the loading position along the axial direction 5. The latch 16 here, on account of a relative movement of the blocking element 36 in relation to the latch 16, is impinged with a torque, such that the latch 16 is pivoted out of the opening and the locking mechanism 15 displays the releasing position.

LIST OF REFERENCE SIGNS

1 Brewing apparatus
2 First brewing chamber element
3 Second brewing chamber element
4 Portion capsule
5 Axial direction
6 Brewing chamber
7 Perforating element
8 Perforating tips
9 Capsule lid
10 Capsule base
11 Discharge duct
12 Drive mechanism
13 Toggle lever joint
14 Hand lever
15 Locking mechanism
16 Latch
16' Further latch
17 Wall part
18 First chamfer
19 Displacing element
20 Second chamfer
21 Return spring
22 Retaining element
22' Retaining arm
22" Retaining spring
23 Receiving element
24 First coupling part
25 Second coupling part
26 First toggle lever
27 Second toggle lever
28 First connecting axle
29 Second connecting axle
30 First wall
31 Second wall
32 Gear wheel connection
33 Connecting point
33' Further connecting point
34 Sealing element
35 Opening
35' Further opening
36 Blocking element
36' Further blocking element
37 Piston
38 Sliding face
38' First sliding side
38" Second sliding side
39 Guiding face
39' First guiding side
39" Second guiding side
40 Retaining apparatus
41 Further retaining arm
100 Direction of movement
101 First holding position
102 Second holding position
102' Further second holding position

The invention claimed is:

1. A brewing apparatus for extracting a portion capsule, having a first brewing chamber element and a second brewing chamber element, wherein at least one of the first brewing chamber element and the second brewing chamber element is movable along an axial direction from a loading position, in which the first brewing chamber element and the second brewing chamber element are spaced apart from one another, into an extracting position, in which the first brewing chamber element and the second brewing chamber element form a substantially closed brewing chamber;

wherein the brewing apparatus displays a drive mechanism for moving at least one of the first brewing chamber element and the second brewing chamber element, wherein the brewing apparatus displays a separate locking mechanism for locking the brewing chamber in the extracting position;

wherein the locking mechanism is a roller-shaped or ball-shaped latch; and wherein a first wall of a wall part of the brewing apparatus displays at least one first chamfer, and a second wall of displacing element displays at least one second chamfer;

wherein the first chamfer, the second chamfer, and a retaining element of the first brewing chamber element contact the latch of the locking mechanism in a locking position.

2. The brewing apparatus as claimed in claim 1, wherein the drive mechanism displays a drive element which is configured to be selected from a group consisting of a toggle lever joint, a gear rack, a spindle, or a pivot gear.

3. The brewing apparatus as claimed in claim 1, wherein the drive mechanism is selected from a group consisting of a drive mechanism that is manually actuatable by means of a hand lever or a drive mechanism that is automatically drivable by means of a drive motor.

4. The brewing apparatus as claimed in claim 1, wherein, for locking the brewing chamber in the extracting position, the locking mechanism is transferable from a releasing position into the locking position.

5. The brewing apparatus as claimed in claim 1, wherein the first brewing chamber element displays a retaining element, at least one return spring, and a displacing element, wherein the retaining element and the displacing element are connected by means of a return spring and wherein the retaining element is displaceable in relation to the displacing element.

6. The brewing apparatus as claimed in claim 1, wherein the locking mechanism displays at least one latch, and that the at least one latch in a releasing position is displaceable along the axial direction between the first brewing chamber element and a wall part.

7. The brewing apparatus as claimed in claim 1, wherein the second chamfer is configured in such a manner that, in an event of the locking mechanism being transferred from a releasing position into the locking position, a movement of the latch in a transverse direction, which is perpendicular to the axial direction, into a cavity which is formed by the first chamfer and the second chamfer is caused.

8. The brewing apparatus as claimed in claim 1, wherein an arrester is configured such that during an extracting process a returning force which acts counter to the axial direction from a retaining element on the latch, which is located in the locking position, is absorbed by the first chamfer.

9. The brewing apparatus as claimed in claim 1, wherein the latch of the locking mechanism displays a sliding face for sliding on a guiding face of a displacing element of the first brewing chamber element.

10. The brewing apparatus as claimed in claim 1, wherein the drive mechanism displays a hand lever and a toggle lever joint, wherein the hand lever displays a first coupling part and the toggle lever joint displays a second coupling part, wherein, in order to transmit a movement of the hand lever to a movement of the toggle lever joint, the first coupling part and the second coupling part are in operative interconnection by way of a gear wheel connection.

11. The brewing apparatus as claimed in claim 10, wherein the toggle lever joint displays a first toggle lever and a second toggle lever, wherein the first toggle lever displays the second coupling part, and the second toggle lever, on a first side, is rotatably connected to the first toggle lever, and, on a second side, is displaceably disposed along the axial direction.

12. A method for operating a brewing apparatus as claimed in claim 1, wherein, in a first method step, at least one of the first brewing chamber element and the second brewing chamber element is moved along an axial direction from a loading position, in which the first brewing chamber element and the second brewing chamber element are spaced apart from one another, into an extracting position, in which the first brewing chamber element and the second brewing chamber element form a substantially closed brewing chamber, and in a second method step, in order for the brewing chamber to be locked by means of the locking mechanism, which is transferable from a releasing position into a locking position in order for the brewing chamber to be locked in the extracting position, a latch of the locking mechanism is displaced in a transverse direction which is perpendicular to the axial direction and/or the latch is pivoted about a pivot axis which is perpendicular to the axial direction.

13. The method as claimed in claim 12, wherein in a third method step, in order for the brewing chamber to be unlocked by means of the locking mechanism, the latch of the locking mechanism is displaced in the transverse direction, and, in a fourth step, at least one of the first brewing chamber element and the second brewing chamber element is moved back along the axial direction, from the extracting position into the loading position.

14. The method as claimed in claim 12, wherein, during the first method step, the latch is displaced in the axial direction from a second chamfer of a displacing element of the first brewing chamber element, and, during the second method step, the latch is displaced in the transverse direction from the second chamfer into a cavity which is formed by a first chamfer of a wall of the brewing apparatus and by the second chamfer, and during an extracting process a returning force which acts counter to the axial direction from a retaining element of the first brewing chamber element on the latch, which is located in the locking position, is jammed in the cavity between the first chamfer, the second chamfer, and the retaining element.

15. The method as claimed in claim 12, wherein, during a third method step, the latch is moved by a first chamfer of a wall of the brewing apparatus in the transverse direction out of a cavity which is formed by the first chamfer and a second chamfer of a displacing element of the first brewing chamber element, and, in a fourth method step, the latch is displaced counter to the axial direction by a retaining element of the first brewing chamber element.

16. The method as claimed in claim 12, wherein during the first method step, a sliding face of the latch is displaced on a guiding face of a displacing element of the first brewing chamber element.

17. The method as claimed in claim 12, wherein during the second method step, the latch is pivoted in such a manner that one end of the latch engages in an opening of a wall part and/or is blocked in relation to a movement in the axial direction by at least one blocking element.

* * * * *